US008797037B2

(12) United States Patent
Brannon et al.

(10) Patent No.: US 8,797,037 B2

(45) Date of Patent: *Aug. 5, 2014

(54) APPARATUS AND METHODS FOR PROVIDING INFORMATION ABOUT ONE OR MORE SUBTERRANEAN FEATURE

(75) Inventors: Harold Dean Brannon, Magnolia, TX (US); Qi Qu, Spring, TX (US); Russell L. Maharidge, Spring, TX (US); Thomas J. Pisklak, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/564,004

(22) Filed: Aug. 1, 2012

(65) Prior Publication Data

US 2013/0043873 A1 Feb. 21, 2013

Related U.S. Application Data

(63) Continuation-in-part of application No. 12/421,061, filed on Apr. 9, 2009, now Pat. No. 8,253,417, and a continuation-in-part of application No. 13/030,570, filed on Feb. 18, 2011.

(60) Provisional application No. 61/044,153, filed on Apr. 11, 2008, provisional application No. 61/306,478, filed on Feb. 20, 2010.

(51) Int. Cl.
*G01V 3/00* (2006.01)

(52) U.S. Cl.
USPC ............ 324/353; 324/366; 324/369; 324/373

(58) Field of Classification Search
USPC .................... 166/250.01–250.17, 244.1–403; 73/152.01–152.62; 324/323–375; 343/703, 709, 718–719; 367/1–86
See application file for complete search history.

(56) References Cited

U.S. PATENT DOCUMENTS

| | | | |
|---|---|---|---|
| 1,619,923 | A | 8/1931 | Schlumberger |
| 1,913,293 | A | 6/1933 | Schlumberger |

(Continued)

FOREIGN PATENT DOCUMENTS

| | | | |
|---|---|---|---|
| WO | 84/02838 | A1 | 8/1984 |
| WO | 00/29716 | A2 | 5/2000 |

(Continued)

OTHER PUBLICATIONS

Mark Halper, Global Business: Norway's Power Push. Is osmosis the answer to the world's energy shortage? Why the "salient gradient" holds promise, TIME, Dec. 13, 2010, pp. Global 1-2, vol. 176.

(Continued)

*Primary Examiner* — Arleen M Vazquez
*Assistant Examiner* — Alesa Allgood
(74) *Attorney, Agent, or Firm* — E. Randall Smith; Jones & Smith, LLP

(57) ABSTRACT

A method of approximating or determining at least one dimension or other characteristic of at least one underground geological feature in a zone of interest proximate to a well bore includes generating an electric field in the zone of interest. At least two sensing electrodes are provided in the well bore and configured to detect differences therebetween in electric potential caused by at least one target object in the zone of interest. Proppant containing signal generating devices (SGD) is delivered into the geological feature(s). The SGD generate a detectable signal in response to at least one downhole condition or property. At least one receiver receives the detectable signals and provides data relating thereto. At least one dimension or other characteristic of the geological feature is approximated or determined based at least partially upon data provided by the sensing electrodes and receiver(s).

20 Claims, 15 Drawing Sheets

(56) References Cited

U.S. PATENT DOCUMENTS

| | | | | |
|---|---|---|---|---|
| 3,012,893 | A | 12/1961 | Kramzner et al. | |
| 3,818,990 | A | 6/1974 | Coulter | |
| 3,985,909 | A | 10/1976 | Kirkpatrick | |
| 4,289,794 | A | 9/1981 | Kleiner et al. | |
| 5,603,971 | A | 2/1997 | Porzio et al. | |
| 5,756,136 | A | 5/1998 | Black et al. | |
| 5,918,262 | A | 6/1999 | Sanford | |
| 5,929,437 | A | 7/1999 | Elliott et al. | |
| 6,023,168 | A | 2/2000 | Minerbo | |
| 6,187,351 | B1 | 2/2001 | Porzio et al. | |
| 6,330,914 | B1 | 12/2001 | Hocking et al. | |
| 6,371,917 | B1 | 4/2002 | Ferrara et al. | |
| 6,562,256 | B1 | 5/2003 | Fleming et al. | |
| 6,652,895 | B2 | 11/2003 | Porzio et al. | |
| 6,684,159 | B2 * | 1/2004 | Khan et al. | 702/16 |
| 6,840,318 | B2 | 1/2005 | Lee et al. | |
| 7,134,492 | B2 | 11/2006 | Willberg et al. | |
| 7,400,262 | B2 | 7/2008 | Chemali et al. | |
| 7,424,911 | B2 | 9/2008 | McCarthy et al. | |
| 7,803,740 | B2 | 9/2010 | Bicerano et al. | |
| 7,803,741 | B2 | 9/2010 | Bicerano et al. | |
| 7,803,742 | B2 | 9/2010 | Bicerano et al. | |
| 7,819,181 | B2 | 10/2010 | Entov et al. | |
| 7,902,125 | B2 | 3/2011 | Bicerano et al. | |
| 8,006,754 | B2 | 8/2011 | Bicerano | |
| 8,006,755 | B2 | 8/2011 | Bicerano | |
| 8,088,718 | B2 | 1/2012 | Bicerano et al. | |
| 8,253,417 | B2 * | 8/2012 | Pislak et al. | 324/353 |
| 8,258,083 | B2 | 9/2012 | Bicerano | |
| 8,278,373 | B2 | 10/2012 | Bicerano et al. | |
| 2003/0205376 | A1 | 11/2003 | Ayoub et al. | |
| 2004/0040707 | A1 | 3/2004 | Dusterhoft et al. | |
| 2004/0176911 | A1 | 9/2004 | Bratton et al. | |
| 2005/0272611 | A1 | 12/2005 | Lord et al. | |
| 2006/0113077 | A1 | 6/2006 | Willberg et al. | |
| 2007/0106006 | A1 | 5/2007 | Cooper et al. | |
| 2007/0114028 | A1 | 5/2007 | Crabtree et al. | |
| 2007/0161515 | A1 | 7/2007 | Bicerano | |
| 2007/0202318 | A1 | 8/2007 | Smith et al. | |
| 2008/0125335 | A1 | 5/2008 | Bhavsar | |
| 2008/0208054 | A1 | 8/2008 | Azuma et al. | |
| 2008/0236814 | A1 | 10/2008 | Roddy | |
| 2008/0314586 | A1 * | 12/2008 | Freeman | 166/254.2 |
| 2009/0022011 | A1 | 1/2009 | Mickael et al. | |
| 2009/0157322 | A1 | 6/2009 | Levin | |
| 2009/0179649 | A1 | 7/2009 | Schmidt et al. | |
| 2009/0211754 | A1 | 8/2009 | Verret et al. | |
| 2009/0250216 | A1 | 10/2009 | Bicerano | |
| 2009/0256575 | A1 | 10/2009 | Pisklak et al. | |
| 2009/0288820 | A1 | 11/2009 | Barron et al. | |
| 2010/0038083 | A1 | 2/2010 | Bicerano | |
| 2010/0155065 | A1 | 6/2010 | Misselbrook | |
| 2010/0158816 | A1 | 6/2010 | Kawabata et al. | |
| 2011/0098202 | A1 | 4/2011 | James et al. | |
| 2012/0031613 | A1 | 2/2012 | Green | |

FOREIGN PATENT DOCUMENTS

| | | | |
|---|---|---|---|
| WO | 2009/032996 | A2 | 3/2009 |
| WO | 2009/047781 | | 4/2009 |
| WO | 2009/047781 | A2 | 4/2009 |
| WO | 2010/068128 | A1 | 6/2010 |
| WO | 2010105177 | A2 | 9/2010 |
| WO | 2011/070453 | A2 | 6/2011 |

OTHER PUBLICATIONS

Brennan, Christopher Earls, "Cavitation and Bubble Dynamics". Oxford University Press 1995, ISBN 0-19-509409-3, http://caitechbook library.calltech.edu.archive/0000001/bubble.htm, 254 pags.

Nano Resbois. Navigating the Reservoirs of Tomorrow, Saudi Aramco, Mar. 6, 2008, http:/www.rigzone.com/news/article.asp?a_id=57957, 2 pages.

Gerhard Von Der Emde et al., "Electric fish measure distance in the dark", Nature, Oct. 29, 1996, vol. 395, pp. 890-894.

James R. Solberg et al., "Robotic Electrolocation: Active Underwater Target Localization with Electric Fields" Proceedings of the 2007 International Conference of Robotics and Automation (ICRA), Apr. 10-14, 2007, Rome, Italy.

James R. Solberg et al., "Active Electrolocation for Underwater Target Localization", The International Jounral of Robotics Research, May 2008, vol. 27, No. 5, pp. 529-548.

SPE 24824, "Fracture Measurement Using Hydraulic Impedance Testing", R.W. Page et al., pp. 605-614.

SPE 77442, "A Practical Guide to Hydraulic Fracture Diagnostic Technologies"R.D. Barree et al., pp. 1-12.

* cited by examiner

APPARATUS AND METHODS FOR PROVIDING INFORMATION ABOUT ONE OR MORE SUBTERRANEAN FEATURE

This application is a continuation-in-part of and claims priority to U.S. patent application Ser. No. 12/421,061, filed Apr. 9, 2009 now U.S. Pat. No. 8,253,417 and entitled "Electrolocation Apparatus and Methods for Mapping from a Subterranean Well", which claims priority to U.S. provisional patent application Ser. No. 61/044,153, filed Apr. 11, 2008 and entitled "Electrolocation Technique for Hydraulic Fracture Mapping", and this application is also a continuation-in-part of and claims priority to U.S. patent application Ser. No. 13/030,570, filed Feb. 18, 2011 and entitled "Apparatus and Methods for Providing Information About One or More Subterranean Variables", which claims priority to U.S. provisional patent application Ser. No. 61/306,478, filed Feb. 20, 2010 and Entitled "Apparatus and Methods for Using Nano-Devices to Provide Information About one or More Subterranean Variables", all of the above disclosures of which are hereby incorporated by reference herein in their entireties.

FIELD OF THE INVENTION

The present disclosure relates generally to assessing geometry and other characteristics in and around subterranean wells and includes, for example, embodiments for estimating at least one dimension or other characteristic of an underground geological feature.

BACKGROUND OF THE INVENTION

In various operations conducted via underground wells, it is often advantageous to be able to gain information about one or more variables existing in the well bore or subterranean formation. In the arena of hydrocarbon exploration and production, example operations during which it may be beneficial to gain such information are drilling, cementing, completion, stimulation (including well treatment) and workover. The variables could be any measurable condition, parameter or property, such as one or more geometric dimension, the location of a particular object or geometric feature, temperature, pressure, flow, chemical composition, in-situ stresses in the well bore or formation, or the like. Note, the present disclosure is not limited by the type of operation, the target location in the well bore or formation or the type of variable.

In one example in the hydrocarbon recovery arena, it is often of significant benefit to learn about the geometry of an area within an underground well or subterranean formation, such as the location or dimensions of hydraulic fractures. Hydraulic fracturing is a widely used process for stimulating oil and gas wells and which typically involves injecting fluid into the well bore at a higher pressure than the surrounding reservoir pressure. The higher pressure of the injected fluids causes the formation to fracture, exposing the surface area through which oil or gas may flow.

Once hydraulic fractures are formed, it is believed to be advantageous to learn about or map out the geometry or dimensions of the fractures, such as to increase the effectiveness of the fracturing process and hydrocarbon production. For example, proppant is typically delivered into the fracture during well treatment to effectively increase the conductivity of the fracture and provide a flow path of hydrocarbons between the reservoir and the producing well bore. Proppants ensure the created flow path remains open and conductive after the treating pressure is relieved. Proper placement of the proppant is often considered one of the most critical facets of fracture stimulation. The propped fracture area is believed to directly correlate with stimulated well potential and productivity, whereby the larger the propped fracture, the more productive the well. It is thus typically advantageous to know the location and/or dimensions of propped fractures or proppant packs within conductive fractures. For example, knowledge of the location of proppant in fractures and/or the dimensions of propped fractures can, in some instances, assist in optimizing and improving fracturing efforts and proppant distribution, well placement and production strategies.

Existing techniques for visualizing underground geometries, such as hydraulic fracture propagations, include micro-seismic fracture mapping, tilt-meter fracture mapping and the use of tracers. These techniques are believed to have one or more drawbacks or limitations. For example, some of these techniques are believed to be limited to representing only one dimension of fracture geometry (e.g., length (depth), height or azimuth). For other examples, some of the current mapping technologies require the use of an offset well, which may dramatically increase costs, and/or radioactive material, which may be environmentally damaging.

It should be understood that the above-described discussion is provided for illustrative purposes only and is not intended to limit the scope or subject matter of this disclosure, the appended claims or the claims of any related patent application or patent. Thus, none of the appended claims or claims of any related patent application or patent should be limited by the above discussion or required to address, include or exclude the above-cited examples, features and/or disadvantages merely because of their mention above.

Accordingly, there exists a need for improved systems, apparatus and methods capable of estimating at least one dimension or other characteristic of an underground well or geological feature having one or more of the attributes, capabilities or features described or claimed below or evident from the appended drawings.

BRIEF SUMMARY OF THE DISCLOSURE

In various embodiments, the present disclosure involves a method of approximating or determining at least one dimension or other characteristic of at least one fracture in an earthen formation. The fracture is at least partially located within a zone of interest in the earthen formation proximate to a subterranean well bore. While the well bore and fracture(s) at least partially contain conductive fluid, the method includes generating an electric field in the zone of interest. At least one target object in the zone of interest has an electrical impedance that differs from the electrical impedance of the conductive fluid and creates perturbations in the electric field. At least two sensing electrodes are provided in the well bore. The sensing electrode(s) are configured to detect differences therebetween in electric potential caused by the target object(s). Proppant containing a plurality of signal generating devices is delivered into the fracture(s). At least some of the signal generating devices in the proppant generate a detectable signal in response to at least one downhole condition or property. At least one receiver receives the detectable signals and provides data relating thereto. At least one dimension or other characteristic of the fracture is approximated or determined based at least partially upon data provided by the sensing electrodes and receiver.

In some embodiments, the present disclosure involves a method of approximating or determining at least one dimension or other characteristic of at least one underground geological feature in an earthen formation. The geological feature is at least partially located within a zone of interest in the earthen formation proximate to a subterranean well bore. While the well bore and geological feature at least partially contain conductive fluid, the method includes generating an electric field in the zone of interest. At least one target object in the zone of interest has an electrical impedance that differs from the electrical impedance of the conductive fluid and creates perturbations in the electric field. At least two sensing electrodes are provided in the well bore. The sensing electrodes detect differences therebetween in electric potential caused by the target object(s) and provide data relating thereto to at least one data processing system. Proppant containing a plurality of signal generating devices is delivered into the geological feature(s). At least some of the signal generating devices generate a detectable signal in response to at least one downhole condition or property. A least one receiver receives at least one of the detectable signals and providing data relating thereto to at least one data processing system. The data processing system approximates or determines at least one dimension or other characteristic of the geological feature(s) based at least partially upon data provided by the sensing electrodes and at least one receiver.

There are embodiments of the present disclosure involving apparatus for approximating or determining at least two dimensions of at least one hydraulic fracture formed in an earthen formation from a subterranean well bore. The hydraulic fracture is at least partially located within a zone of interest in the earthen formation that is proximate to the well bore. A conductive fluid is disposed at least temporarily in at least part of the well bore and hydraulic fracture. At least two spaced-apart electric field generating electrodes are configured to create an electric field in the zone of interest. At least one target object is disposed within the zone of interest outside the well bore, has a different electrical impedance as compared to the conductive fluid and is capable of creating perturbations in the electric field. At least two spaced-apart sensing electrodes are disposed within the well bore and configured to detect differences therebetween in electric potential measured in volts caused by the target object(s) and provide data relating thereto.

Proppant, containing a plurality of signal generating devices, is configured to be delivered into the hydraulic fracture(s). At least some of signal generating devices are configured to generate a detectable signal in response to at least one downhole condition or property. At least one receiver is configured to receive the detectable signal(s) and provides data relating thereto. At least one data processing system is configured to approximate or determine at least two dimensions of the hydraulic fracture(s) based at least partially upon data provided by the sensing electrodes and receiver(s).

Accordingly, the present disclosure includes features and advantages which are believed to enable it to advance underground investigation or mapping technology. Characteristics and potential advantages of the present disclosure described above and additional potential features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
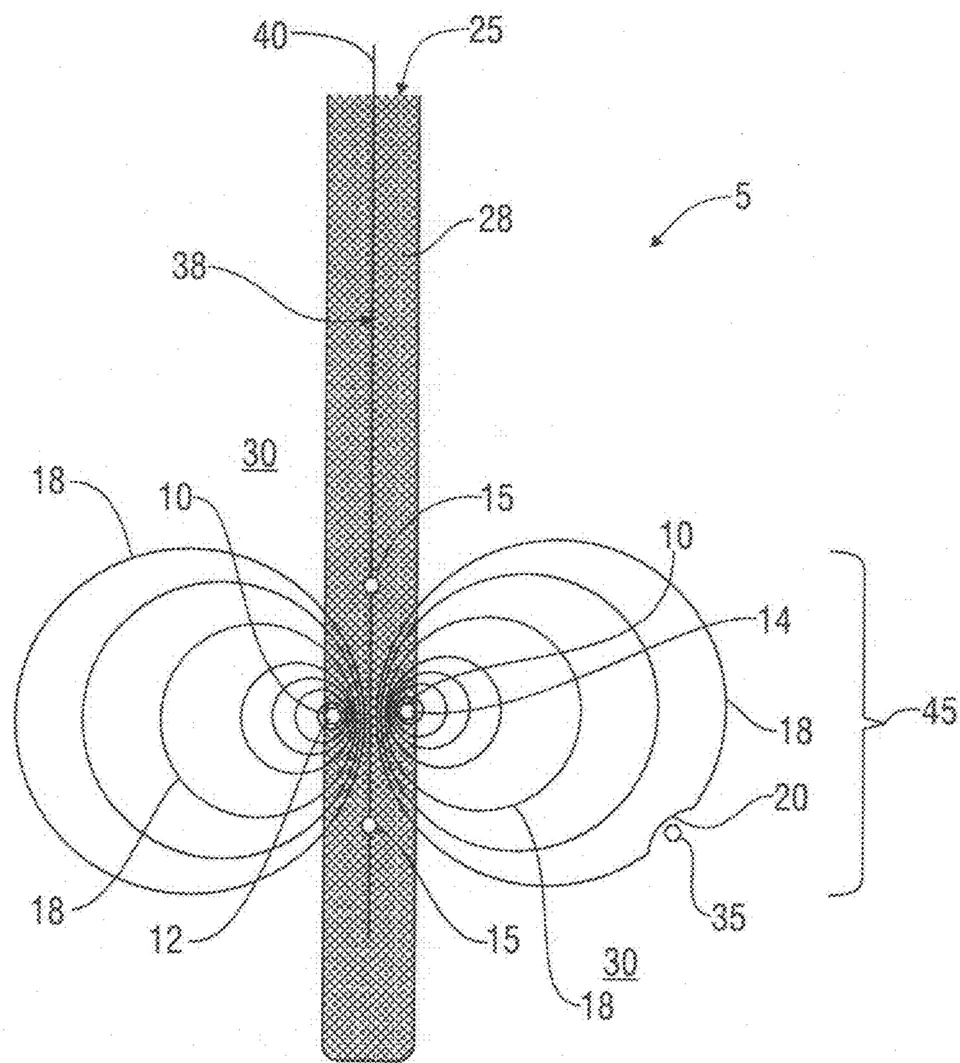
FIG. 1 is a schematic diagram showing an exemplary electrolocation system in accordance with an embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application, any patent granted hereon or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments, common or similar elements are referenced in the appended figures with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms “invention”, “present invention” and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms “coupled”, “connected”, “engaged” and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms “including” and “comprising” are used herein and in the appended claims in an open-ended fashion, and thus should be interpreted to mean “including, but not limited to . . . . ” Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an electrolocation system 5 in accordance with an embodiment of the present disclosure includes at least two electric field generating electrodes 10 and at least one sensing electrode 15 disposed within, or proximate to, an underground well bore 25. In this example, the well bore 25 is part of an open-hole (non-metallic cased) well or well-section. Fluid 28 is provided in the well bore 25, which is surrounded generally by an earthen formation 30. At least one target object 35 is at least partially located within a zone of interest 45 of the formation 30 adjacent to or near the well bore 25.

FIG. 1 illustrates exemplary electrodes 10 configured to create an electric field that reaches the zone of interest 45 and shows exemplary contour lines of equal electric potential 18. The sensing electrode(s) 15 detect perturbations 20 in the electric field caused by the target object(s) 35. To create the electric field, one or more of the electric field generating electrodes 10 is positively charged and thus serves a positive electric field generating electrode (e.g. electrode 12) and another one or more of the electric field generating electrodes 10 is negatively charged and thus serves as a negative, or return, electric field generating electrode (e.g. electrode 14). However, in some embodiments, any of the electrodes 10 may serve as either a positive electric field generating electrode 12 or a negative electric field generating electrode 14 and may change or alternate polarity during usage. Based upon data collected by the sensing electrodes 15 and with the application of electrolocation principals, at least one dimension or other characteristic of at least one portion of, or feature in, the formation 30 in the zone of interest 45, the well bore 25 or a geometric interface therebetween may be determined or estimated.

Any suitable conductive fluid 28 is provided in the well bore 25 to allow the electric field to be created and perturbations to be detectable. For example, the fluid 28 may be fracturing fluid introduced during hydraulic fracture formation.

Without being limited by theory, “electrolocation” is known to generally involve an electric field generated in a medium and objects located in the medium. The objects differ in impedance from the medium and other objects therein, and create distortions, or perturbations, in the electric field that can be detected by sensors. It should be noted, however, that while this general concept or process is referred to herein as “electrolocation”, it may be referred to with the use of any other suitable terms, such as “electrosensing” and the like. Thus, the use of the term “electrolocation” is not intended to and should not be construed to be limiting upon the present disclosed or appended claims. The detected data can be used to estimate or determine one or more characteristic of the objects such as, for example, the location of the objects. Further details about electrolocation and example electrolocation techniques, systems, applications and mathematical models relating thereto may be found in various publicly accessible documents and sources, including, without limitation, the article Emde et al., “Electric Fish Measure Distance in the Dark,” Nature, vol. 395, pgs. 890-894 (Oct. 29, 1998), the article Solberg et al., “Robotic Electrolocation: Active Underwater Target Localization with Electric Fields,” Proceedings of the 2007 International Conference on Robotics and Automation (ICRA), Apr. 10-14, 2007, Rome, Italy, pp. 1-16, and the article Solberg et al., “Active Electrolocation for Underwater Target Localization,” The International Journal of Robotics Research, Vol. 27, No. 5, May 2008, pp. 529-548, each of which is hereby incorporated by reference herein in its entirety. However, the present disclosure is not limited to the details, techniques or applications disclosed in any of the above or any other references.

The electrolocation system 5 of the embodiment of FIG. 1 is located in-situ in the well bore 25 without requiring the use of an offset well (not shown). The electrodes 10, 15 of the illustrated system 5 are disposed on a carrier 38, such as a wireline 40, which can be inserted into, moved within and removed from the well bore 25. However, the electrodes 10, 15 may be positioned or delivered in any other suitable manner. For example, some or all of the electrodes 10, 15 may be disposed upon one or more pads (not shown) that are movable within the well bore 25. For another example, some or all of the electrodes 10, 15 may be carried on one or more drill string or other pipe, coiled tubing, tool or other component (not shown) moveable within the well bore 25. In yet other embodiments, some or all of the electrodes 10, 15 may be attached to or embedded in a casing (not shown) disposed in the well bore 25. For example, the electrodes 10, 15 may be affixed to the outer diameter of the casing. When some or all of the electrodes 10, 15 are embedded in or affixed to metallic casing, special arrangements of electrodes 10, 15 may be required to be able to measure perturbations caused by the target object(s) 35. Evaluating through-casing resistivity for measuring current leakage may be necessary to sufficiently remove the influence or effect of the casing for accurate data recovery and analysis. For yet another example, some or all of the electrodes 10, 15 may be embedded in or affixed to a non-conductive casing, or casing that does not strongly disturb the electric field, such as a composite casing. In other embodiments, some or all of the electrodes 10, 15 may be attached to or embedded in another component, fixture or area proximate to the casing, such as insulation or cement.

Referring still to FIG. 1, the electric field generating electrode(s) 10 may have any desired dimensions, form, construction, configuration, arrangement and operation suitable for creating an electric field. Without limitation, examples of suitable electric field generating electrodes 10 may include metal pieces or wire constructed of or coated with silver, gold, or other highly conductive materials. In the illustrated embodiment, the system 5 includes one positive electric field generating electrode 12 and one negative electric field generating electrode 14. However, in other embodiments, the system 5 may include any desired quantity of positive and negative electric field generating electrodes 12, 14. For example, the system 5 may include a single positive electric field generating electrode 12 (not shown), such as an elongated highly conductive metal piece, along with a multitude of negative electric field generating electrodes 14, all disposed within the well bore 25. For another example, one or more positive electric field generating electrodes 12 may be disposed within the well bore 25 and one or more negative electric field generating electrodes 14 may be located at or near the earth's surface (not shown) or another location outside the well bore 25.

The electric field generating electrodes 10 may be spaced apart by any desired distance to provide the desired electric field. Generally, the size of the electric field and depth of penetration into the formation 30 may be affected by the quantity and/or relative positioning of the electric field generating electrodes 10. Moreover, the actual arrangement of electrodes 10, 15 may depend upon the particular application. For example, in some applications, a large number of electric field generating electrodes 10, such as ten, fifteen, twenty, thirty, etc., disposed along and spaced apart on a single wire, or other elongated carrier, in the well bore 25 will provide a larger depth of electric field penetration than a pair of electrodes 10 disposed at opposite ends of the wire.

Still referring to FIG. 1, the sensing electrode(s) 15 may have any desired dimensions, form, construction, configuration, arrangement and operation suitable for detecting perturbations 20 in the created electric field. Without limitation, examples of suitable sensing electrodes 15 may include metal pieces or wire constructed of or coated with silver, gold, or other highly conductive materials. In other embodiments, the sensing electrodes 15 may be more sophisticated (even multipurpose) sensors, as are and become further known. In this embodiment, the system 5 includes two sensing electrodes 15. However, in other embodiments, the system 5 may include only one, or more than two, sensing electrodes 15. For example, in some embodiments, the system 5 may include a multitude, such as twenty, sensing electrodes 15. (It should be noted that in embodiments involving only one sensing electrode 15, it may be necessary or desirable to include at least one ground (e.g. metallic casing) or reference voltage disposed within or proximate to the well bore 25.)

The exemplary sensing electrodes 15 may be positioned at any desired location suitable for detecting perturbations 20 in the created electric field. In the illustrated embodiment, the sensing electrodes 15 are suitably positioned in the well bore 25 in or along the zone of interest 45 in the formation 30 to be able to detect perturbations 20 in the electric field caused by the target object(s) 35. In another embodiment, for example, a system 5 may include multiple pairs of electric field generating electrodes 10 spaced apart in a single line, such as by 1", and multiple sensing electrodes 15 offset relative thereto.

Still referring to the example of FIG. 1, the target objects 35 may be located in the zone of interest 45 in any suitable manner and include any desired structure, object or material capable of creating detectable perturbations in the electric field useful to approximate or determine the desired dimension(s) or other characteristics of the subject geological feature or area. For example, the target object(s) 35 may be part of the earthen formation 30, such as one or more hydraulic fractures or fracture surfaces (not shown), that will display a sufficient electrical (resistivity) contrast to everything else in the well bore 25 and/or zone of interest 45 (e.g. fluid, proppants, rock) to produce meaningful perturbation data. For another example, the target object(s) 35 may be one or more object(s) or material(s) positioned in one or more hydraulic fracture(s) and which possesses an electrical impedance that differs from the impedance of the fluid 28 and/or other objects and structures in the well bore 25 and zone of interest 45. In some instances, the target objects 35 may be proppant placed into the hydraulic fracture(s) and which have sufficient electrical contrast. As used herein, the term "proppant" includes any substance, composite or fluid-particle mixture useful for assisting in propping open a fracture, crack or other area in an underground earthen formation, or other desired purpose in a well bore or subterranean formation. While the presence of proppant in the fracture may not be necessary to measure perturbations of various target objects, it may, in at least some situations, make the perturbations stronger and thus assist in obtaining useful data. When proppant is relied upon to conduct electric current, the proppant particles should preferably be in contact with one another and the fracture wall.

In yet other embodiments, the target objects 35 may be material or particles contained within or carried by fluid 28 or proppant provided in the well bore 25. Some examples are beads constructed of or coated with metal, plastic or other material capable of raising or lowering electrical conductivity, as may be desired depending upon the particular well conditions. In even other embodiments, the target objects 35 may include particles, such as, for example, nanoparticles, suspended in the fracturing or other fluid in the well bore 25.

In any case, any suitable material may be used as target objects 35 or altered to provide a sufficient difference in electrical impedance as compared to the fluid 28, formation 30 and other material and objects in the well bore 25 and zone of interest 45 to create perturbations 20 in the electric field that may be detected by the sensing electrodes 15. Likewise, if desired, the target objects 35 may include a combination of the above or other examples. Moreover, different target objects 35 may be used at different times during operation of the system 5. For example, in some applications, perturbations or electric potential may be measured from a well bore 25 before a fracture is formed (when there may be no target objects present), during or after formation of the fracture and after fracture closure (with proppant in the fracture), each scenario potentially involving different target objects 35.

If desired, the target objects 35 may have a tunable, or variable, electrical impedance and thus be functionalized target objects. Increasing or decreasing the impedance of the functionalized target object could be useful to cause a desired interaction with the electric field and improve data accuracy based upon particular conditions in the well bore 25. Target objects 35 may be functionalized in any suitable manner. For example, particles having a desired impedance may be added to the target objects 35 to make them functionalized target objects. In some embodiments, the particles may be coated onto, integrated into or mixed with the target objects 35. For one example, when the target objects 35 include nanoparticles suspended in fracturing fluid, iron nanoparticles may be added to increase the conductivity and decrease the resistance of the target objects 35 and provide the desired interaction with the electric field.

The electrolocation system 5 of FIG. 1 is configured to provide data for mapping or estimating one or more dimensions or other characteristics of at least one area or geological feature proximate to the well bore 25 and/or in the adjacent formation 30. In one exemplary application, the target objects 35 are located at one or more hydraulic fracture (not shown) formed in the formation 30 in the zone of interest 45. Perturbations 20 in the electric field caused by the target objects 35 are detected and used to deduce at least part of the geometry of the fractures. For example, one or more among the approximate length (depth), width, height and azimuth of one or more fracture may be at least partially deduced from the output of the sensing electrodes 15. In still further embodiments, the deduced geometry may include the entire geometry of the subject fracture(s).

Figure 2A:
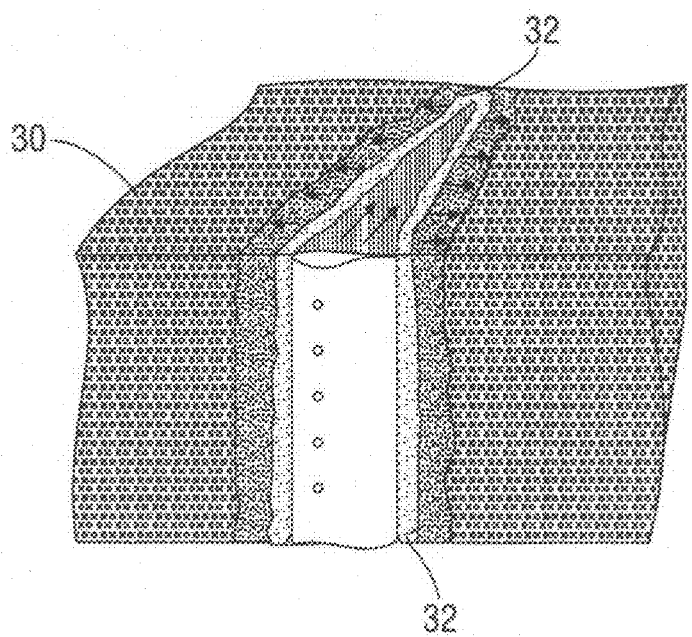
FIG. 2A is a perspective view of a wing of an exemplary bi-wing symmetrical hydraulic fracture formed in an earthen formation through hydraulic fracturing.

For example, FIG. 2A illustrates one wing (referred to as "fracture" 32) of a bi-wing symmetrical hydraulic fracture formed in the earthen formation 30 through hydraulic fracturing. In accordance with embodiments of the present disclosure, at least one dimension of the fracture 32 may be determined or estimated using electrolocation. For example, referring to FIG. 2B, the approximate width W and/or height H of the fracture 32 may be estimated.

Figure 2B:
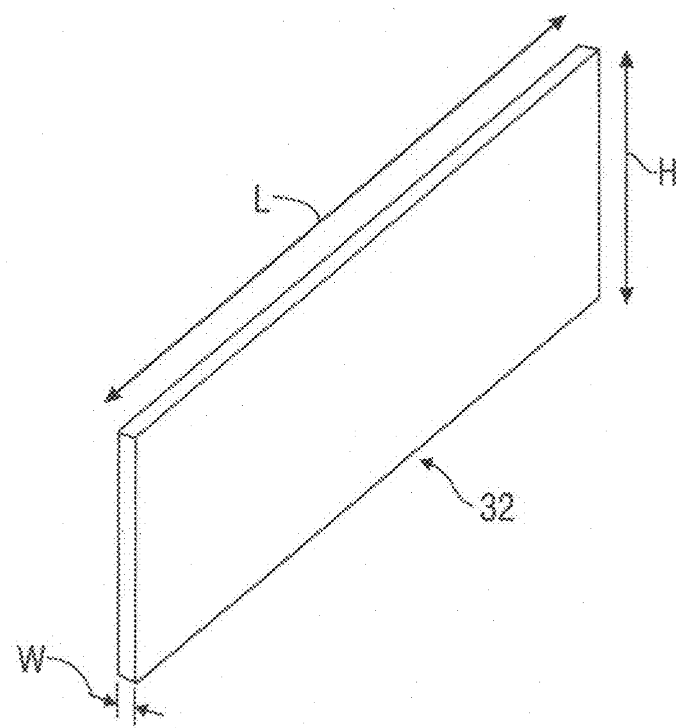
FIG. 2B is a schematic diagram showing the length, height and width of the hydraulic fracture wing shown in FIG. 2A.

For another example, in some embodiments, the length (depth) L of the fracture 32 may be estimated. (It should be noted that length L of FIG. 2B represents the length of one wing of the actual exemplary bi-wing fracture.) To provide a sufficient electric field to estimate length L of a fracture or other geological feature using electrolocation, a special arrangement of electrodes 10 and/or 15 may be necessary. For example, it may be necessary to expand the positioning and/or quantity of the positive electric field generating electrodes 12. In some applications, the depth of penetration into the formation 30 of the electric field by the positive electric field generating electrodes 12 may be equal to the length of the full line of electrodes 12 or twice that value. A multitude of positive electric field generating electrodes 12, such as twenty, may be spaced-apart in a single long line and directionally oriented toward the fracture 32 to synchronously inject current in parallel in the same direction to extend the full length L of the fracture 32. In other embodiments, a single elongated positive electric field generating electrode 12 may be used. A special electrode carrier (not used) may be necessary, such as to directionally or azimuthally arrange the electrodes 12. For example, the carrier may include one or more metal sheet shaped into a 30 or 60 degree angle. In any case, the necessary quantity and arrangement of the electrodes 12 may depend upon the particular application. Further, it may also be necessary to determine other variables, such as the volume, surface area, width W and/or height H of the fracture 32, in order to estimate length L.

However, the present disclosure is not limited to determining the above-described dimensions of hydraulic fractures. Other exemplary features that may be measured or mapped in accordance with the present disclosure are naturally occurring fractures, wormholes or channels created by matrix stimulation, and the like.

In an example operation of the embodiment of FIG. 1, any suitable fluid, such as fracturing fluid or a brine, is provided into at least part of the well bore 25 and zone of interest 45. The exemplary electric field generating electrodes 10 are spaced a pre-established or desired distance apart and disposed at a suitable location in the well bore 25 to provide an electric field in the zone of interest 45. The sensing electrodes 15 are spaced apart a pre-established, or desired, distance and disposed at a suitable location in the well bore 25 or formation 30 to detect perturbations of desired target objects 35 (or the absence thereof) in the zone of interest 45. The perturbations may, for example, represent a detected change in electrical impedance caused by structures of the formation 30, such as fractures formed therein, or material placed in the fractures, such as proppant or nanoparticles, such as described above.

In another sample operation of the embodiment of FIG. 1, the carrier 38 is lowered to a desired position (e.g. at or near the bottom or toe of the well bore 25) and a multitude of readings taken as the carrier 38 is moved axially and/or rotationally in the well bore 25. Perturbation readings are taken at different positions of the electrodes 10, 15 relative to the target object(s). In some cases, this process is repeated at different times in the development of the well or earthen formation, such as before fracturing the formation 30 (before or during the pumping of fracturing fluid into the well bore 25), when there may be no target objects 35, and after fracture closure. If desired, perturbations may be measured several times while fracturing fluid (or other conductive fluid or material) is penetrating the fracture, such as to assist in tracking the propagation thereof or identify the location and/or movement of the front end of the fracturing fluid (or other conductive fluid or material) in the fracture. Electric potential readings may be taken by the electrodes 15 prior to creation of geological features (e.g. hydraulic fractures), or in portions of the zone of interest 45 or other sections of the earthen formation, where there are no geological features. In some cases, there may be no target objects 35 present in the measured region and the electric potential difference determination may be zero Volts.

In many embodiments, the more readings taken by the electrodes 15 and the more positions of the electrodes 10, 15 for such readings, the greater the accuracy, usefulness and resolution of the resulting data. For example, it may be beneficial to vary the region or depth of investigation in the zone of interest 45 of the formation 30 by changing the position of the sensing electrodes 15 and utilizing signal processing techniques (e.g. switching signal processing modes). Also in some embodiments, the more electrodes 10, 15 included in the system 5, the less axial and rotational movement may be necessary for accurate and useful data. For example, different sensing electrodes 15 or sets of sensing electrodes 15 may be positioned at different depths in the well bore 25 so that each will detect perturbations to a certain depth. During the process of taking multiple perturbation measurements, it may be desirable to move one or more of the electrodes 10, 15 relative to one or more other electrode 10, 15 or the geological feature to be evaluated to optimize accuracy and usefulness of the results.

As described above, any suitable target objects 35 may be used to produce the desired data. For example, when the desired data involves dimensions of fractures in the formation, perturbation data may be recovered based upon the difference in electric conductivity between the fracture (hole) and the formation wall adjacent to the fracture and fluid 28 in the well bore 25. For another example, target objects 35, such as material having a different electrical conductivity, can be added to deliberately increase the electrical contrast and improve or enhance the perturbation readings.

Depending upon the accuracy or usefulness of the readings or changes in the downhole conditions, the impedance of the target objects 35 may be changed. In some instances, it may be desirable to add more or less conductive material to fracture fluid or proppants inserted into the fracture(s) to create a greater electrical contrast as compared to the fracture fluid itself, the proppant and/or earthen formation 30 around the fracture. Thus, at any stage in the exemplary process, if perturbation readings are insufficient, target objects 35 may be added or altered in any desired manner to increase or decrease electrical impedance and contrast, as necessary. For example, specialized proppants or particles, such as described above, may be inserted into the well bore 25 or mixed with fluid or proppants provided in the well bore 25.

Still referring to FIG. 1, the system 5 may be used in mapping or approximating one or more dimension of one or more fractures (or other geological feature) in the formation along multiple intervals or angles in the well bore 25. In some embodiments, the wireline 40 (or other carrier) may be moved upwardly in the well bore 25 to locate the corresponding electrodes 10, 15 at a desired second position, such as a next higher fracture interval or area within the same fracture interval. At that location, an electric field may be provided into a new zone of interest by the electric field generating electrodes 10 and perturbations from one or more target objects 35 therein may be measured by the sensing electrodes 25, such as described above. This process may be repeated at multiple successive locations, as desired, such as corresponding to hydraulic fracture intervals, pre-determined spacing intervals or based upon any other criteria.

In other embodiments, multiple sets of corresponding electrodes 10, 15 may be disposed on the same wireline 40 or other carrier at spaced intervals so that after the wireline 40 or carrier is lowered into the well, perturbations can be measured at multiple locations without completely repositioning the wireline 40 or other carrier. In still further embodiments, multiple sets of corresponding electrodes 10, 15 may be embedded in, or connected with, a casing (not shown) or other component or fixture in the well bore 25 (such as described above) at desired intervals to measure perturbations from target objects at different locations.

After data is obtained by the electrodes 15, any methods suitable for processing such information and ultimately deducing and/or mapping the desired dimensions, geometry or spatial relationships from the detected perturbations as is and become further known may be used. For example, a multitude of different electric potential readings from the sensing electrodes 15 taken at different times and/or locations may be used to map out the electric field, formation 30 and/or subject geological feature(s) in a series of iso-potential maps. One or more data processing system (computer or other computing device) may be used. The data processing system may be integrated with the electrodes 15, such as, for example, to dynamically control and vary the location and performance of the electrodes 10 and/or 15 and to process data. In the present embodiment, mathematical modeling techniques, as are and become further known, may be used to formulate and apply appropriate algorithms via one or more computing device to determine the relationship between detected perturbations and the boundaries or desired dimensions of associated fractures. As an example, the above-cited "Solberg" references, all of which are incorporated herein by reference in the entireties, disclose algorithms for determining locations based on detected electrical perturbations and inversion processing for inverting measure perturbations.

Experimentation: Background.

Experiments were conducted to illustrate principals applicable in accordance with an embodiment of the present disclosure. However, it should be understood that the present disclosure and appended claims are not strictly limited to any of the details of the experimentation as described below and shown in the referenced figures.

Figure 3A:
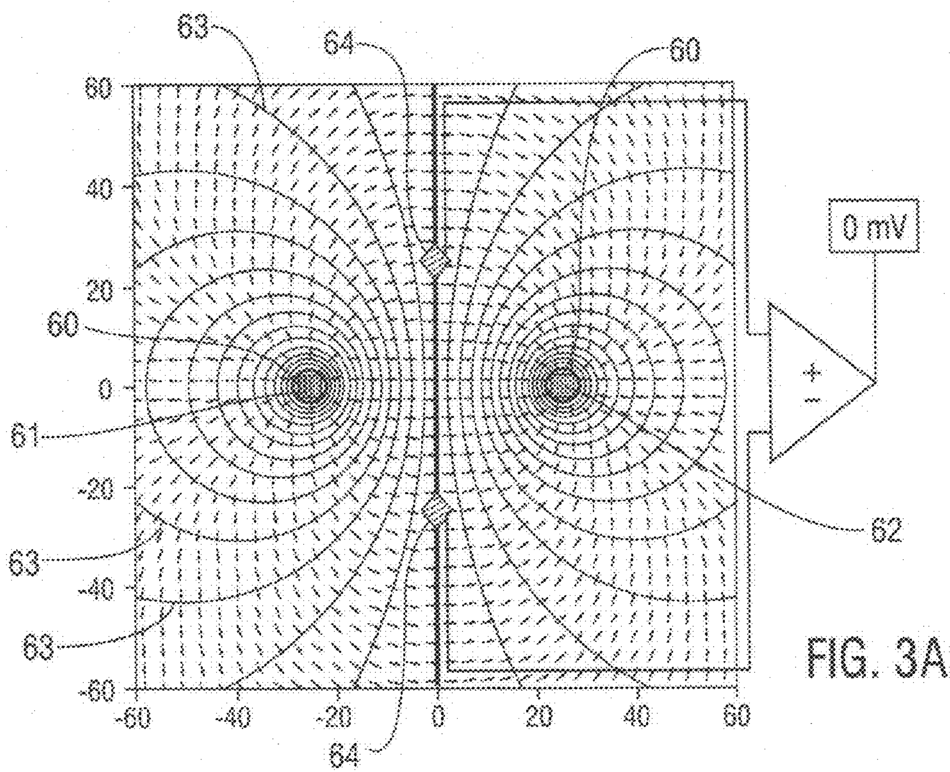
FIG. 3A is a schematic diagram of an unperturbed planar electric field shown to illustrate principals applicable in accordance with an embodiment of the present disclosure.

To experimentally verify the ability to approximate one or more dimension, geometric feature or spatial relationship in a well bore, a device was built to generate 2V (peak-to-peak) biphasic 1 kHz square wave. An electric field was generated between two submerged silver electrodes plated with silver chloride to improve the metal-water electrical interface. These electrodes are represented in FIG. 3A as the electric field generating electrodes 60, which were positioned approximately 50 mm apart. Two sensing electrodes 64 were positioned about 50 mm apart, forming an overall diamond pattern with the electric field generating electrodes 60. The pairs of electrodes 60, 64 made up the electrode assembly 66 (e.g. FIG. 6). Both the electric field generating electrodes 60 and the sensing electrodes 64 were constructed of 0.38 mm diameter silver wires that were stabilized by 0.5 mm borate silicate glass pipettes. However, the electrodes 60, 64 are not limited to this specific composition, geometry and arrangement, but may be constructed of other materials and designed and arranged as desired to accommodate differing conditions, such as in subterranean oilfield applications.

Figure 3B:
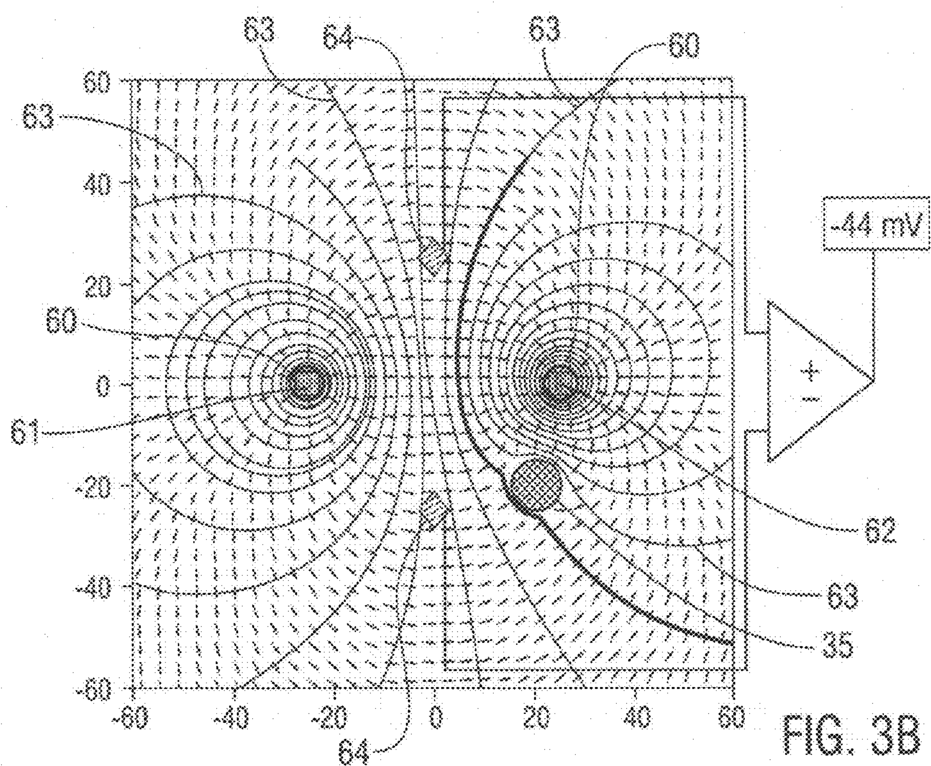
FIG. 3B is a schematic diagram of the planer electric field of FIG. 3A that is perturbed by a circular target object centered at x=20 and y=−20.

FIG. 3A illustrates an exemplary unperturbed planar electric field. The arrows represent the electric current flowing from the positive electric field generating electrode 61 to the negative electric field generating electrode 62. The contour lines 63 represent lines of equal electric potential. No target object is present to distort the electric field. The sensing electrodes 64 are positioned where they would give identical readings with no target objects present. Both electrodes 64 lie on the iso-potential contour of zero Volts so a zero voltage differential between the sensing electrodes 64 exists. For the purpose of illustration, FIG. 3B is provided to show the planar electric field representation of FIG. 3A perturbed by a circular target object 35, such as a perforation or hole in the wall of the well bore, centered at x=20 and y=−20. The top electrode 64 is reading 78 mV, while the bottom electrode 64 is reading 122 mV. Thus, in this example, there is a difference in potential between the respective sensing electrodes 64 of −44 mV.

In measuring perturbations caused by one or more target object, the signals recorded at the sensing electrodes 64 were differentially amplified and the resulting signal, along with its negative, was sent to an analog switch. The analog switch passed one of the two input signals to an output according to a switching signal, which was the original square-wave used to generate the electric field. This served as a matched filter, since only sensory signals having the same frequency as the field signal have a nonzero time-averaged mean at the output of the analog switch. The final stage was a low-pass filter that outputs this mean value.

Two computers were used for information processing. One computer ran a real-time operating system (xPC, The Mathworks, Natick Mass. USA) and handled low-level control of movement and recording and filtering of the measurements. A second computer received the filtered data from the real-time computer, generated the next position of the electrode assembly (readings were taken at multiple locations) and sent such information to the real-time computer. All algorithms were implemented with commercial software (Simulink, Real Time Workshop, xPC Target, and MATLAB: The Mathworks, Natick Mass. USA).

Figure 4:
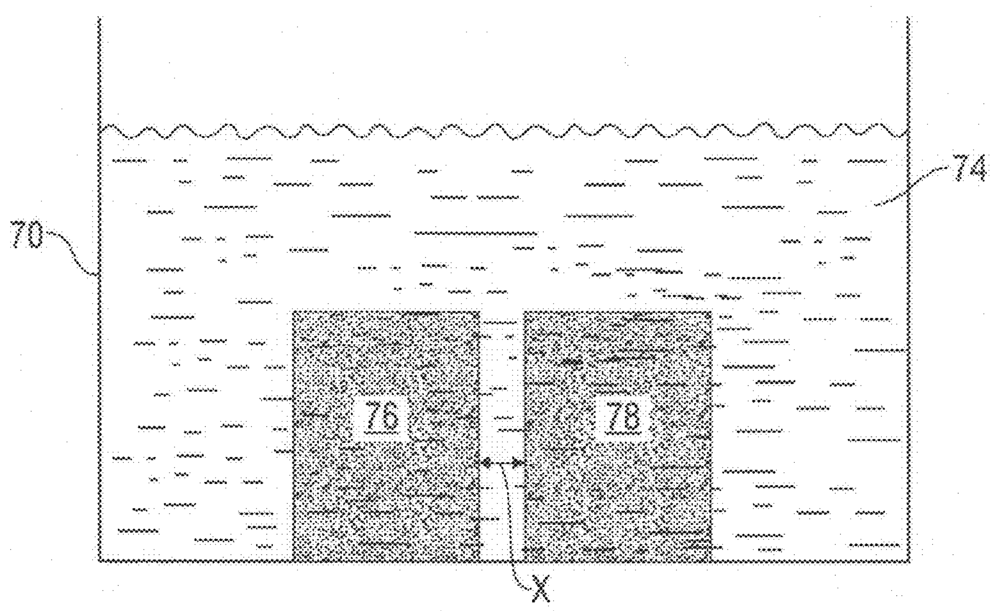
FIG. 4 is a front view of an example testing tank with experimental sandstone pieces used in a first example experiment to illustrate principals applicable in accordance with an embodiment of the present disclosure.

Experiments were conducted in a 750 mm by 750 mm glass tank 70 (e.g. FIG. 4) filled to a depth of approximately 160 mm. In order to minimize the effects of the tank walls on the electric field, experiments were conducted in a central region of 200 mm by 200 mm. Low concentration of NaCl aqueous solution 74 (e. g. FIG. 4) was used in the experiments, although other types of brines may instead be used. All tests were done at ambient conditions.

Experiment #1: Measurement of the Gaps Between Sandstone Rocks.

As shown in FIG. 4, two pieces of sandstone rock 76, 78 were placed in the tank 70 and separated by gap x. The facing sides of the sandstone pieces 76, 78 represented the target objects. This experiment simulated using electrolocation to measure the width and height of a crack, such as a fracture in an earthen formation. The electric field potential was measured (as outlined above) and an isopotential map was produced. This process was repeated multiple times, each time varying the gap (x value) ranging from 0-16 mm.

Figure 5:
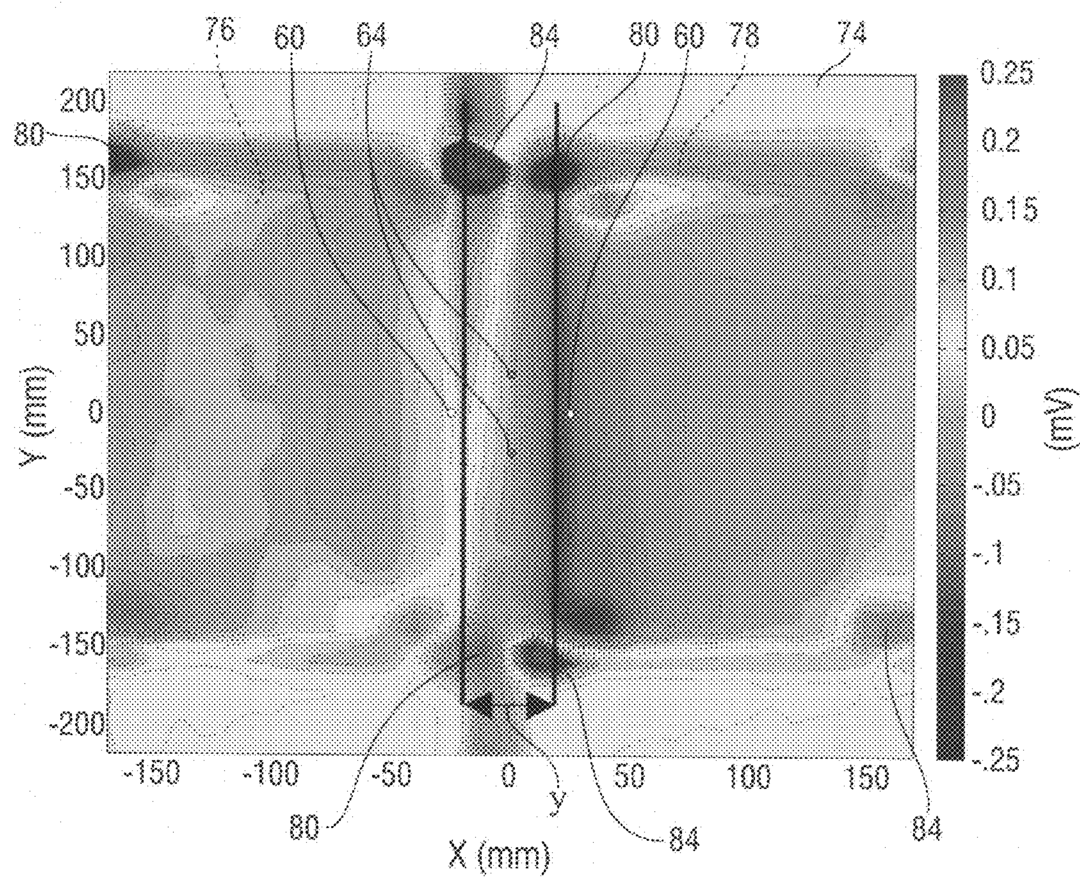
FIG. 5 is a two-dimensional iso-potential map from a three-dimensional graphical representation showing results generated in the first example experiment.

FIG. 5 illustrates an example isopotential map that was generated. The side bar indicates the difference in electric potential in mV and the x and y axes correspond to the reading of coordinates. Electrical potential that was lower than that of the fluid is represented in blue. The areas of lowest potential are represented with concentrated blue areas, or lobe slices 80. Electrical potential that was higher than that of the fluid is represented in red. The areas of highest potential are represented with concentrated red areas, or lobe slices 84.

As shown, the map provides a general outline of the blocks 76, 78 based upon voltage. A gap "y" is clearly visible between the isopotential contours, or lobe slices, 80, 84 in the middle region of the map, representing differences in electrical impedance between the saltwater 74 and sandstone pieces 76, 78. The highest potential difference is thus shown generated at the gap y, representing where the blocks 76, 78 were separated. The measured gap between the lobe slices 80, 84 is proportional to the actual gap x (FIG. 4) between the sandstone pieces 76, 78. Further, the length of the gap y corresponds with the length of the gap between the blocks 76, 78. A y-value was obtained in each successive isopotential map generated after adjusting the gap (x values) in the different runs. Results demonstrated linear relationship between x and y, as $y \propto x$. indicating this methodology can be used to determine underground fracture width and also length.

Experiment #2: Measurement of Diameters of the Holes in a Sandstone Rock.

Figure 6:
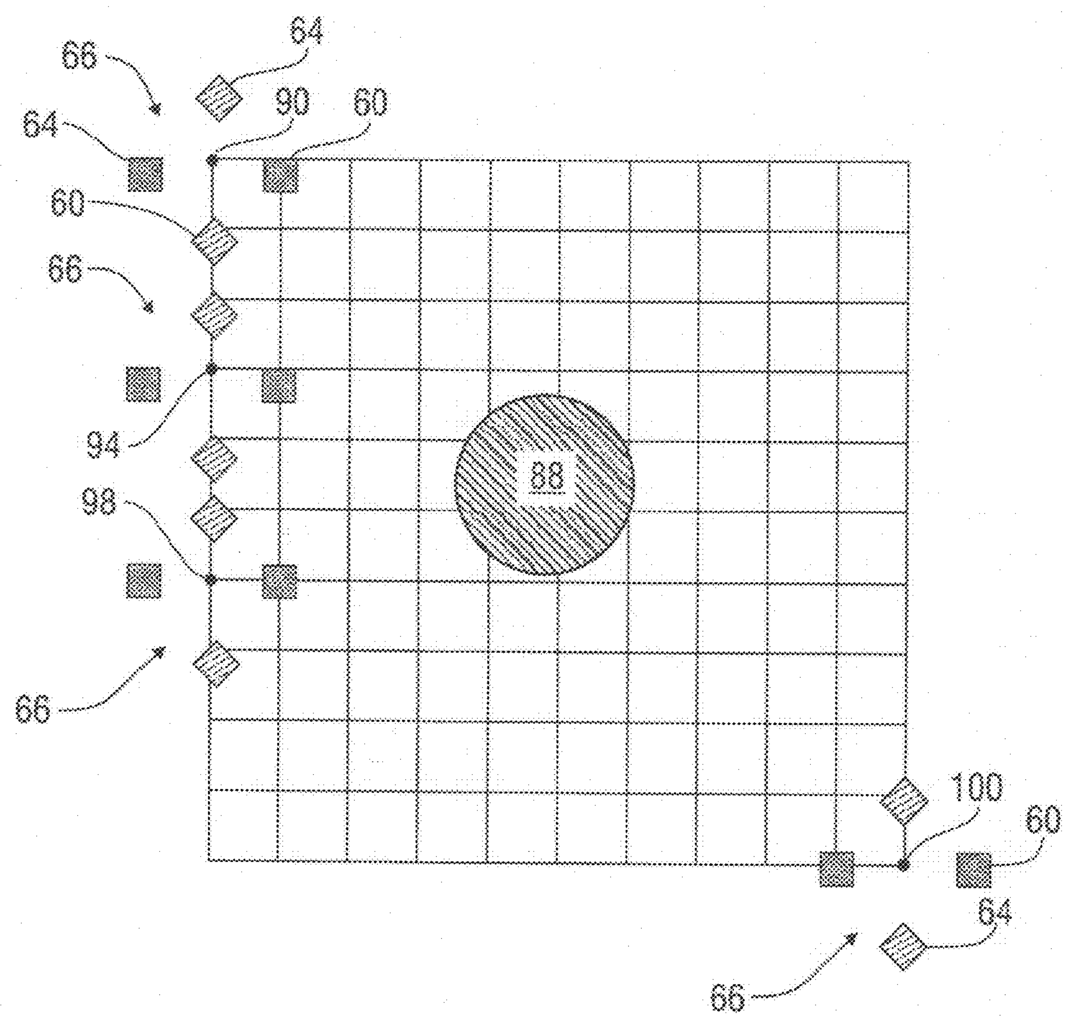
FIG. 6 is a schematic diagram showing the placement of an example electrode assembly relative to a hole formed in a sandstone piece used in a second example experiment to illustrate principals applicable in accordance with an embodiment of the present disclosure.

Referring to FIG. 6, a piece of sandstone rock with a hole 88 was placed in the tank. The electrode assembly 66 was placed in a first position 90 above the sandstone rock relative to the hole 88 and the electric field potential was measured (by steps outlined above). The electrode assembly 66 was moved to a second position 94, then to a third position 98 etc. to the nth position 100 according to the grid pattern illustrated in FIG. 6 to cover the entire area over the rock, with electric field potential measured at each position.

Figure 7:
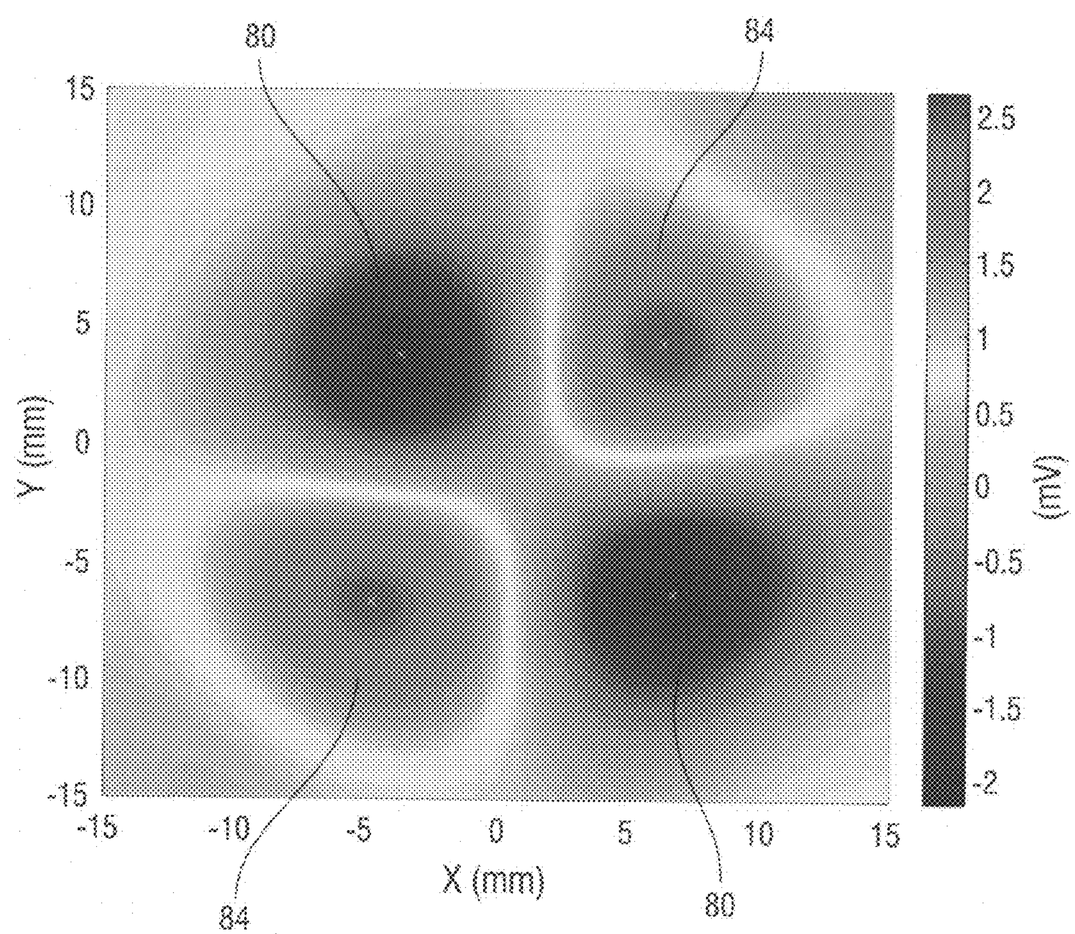
FIG. 7 is a two-dimensional iso-potential map from a three-dimensional graphical representation showing results generated in the second example experiment.

The information gathered was used to generate the electric field isopotential map shown in FIG. 7. The side bar indicates the difference in electric potential in mV and the x and y axes correspond to the reading of coordinates. The distance between the centers (x) of the lobe slices 80, 84, or lobe peak radius (LPR), was measured and averaged.

Multiple shapes of sandstone rock with holes 88 of different diameters (ranging from 4 mm to 16 mm) were tested. Each sandstone rock was independently placed in the tank. The electric field potential was measured for each rock and an isopotential map produced. The average LPR was measured and calculated for each map.

Figure 8:
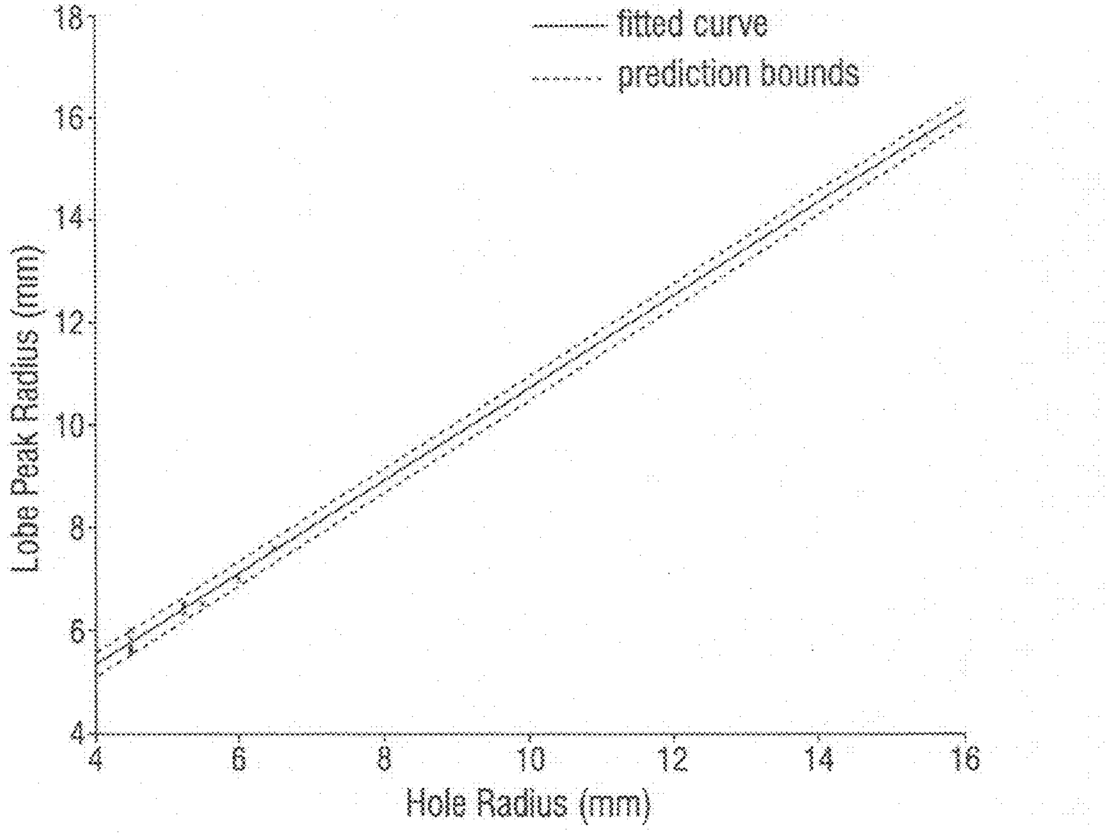
FIG. 8 is a graph showing results and predicted bounds deduced therefrom from the second example experiment.

The average LPR and corresponding hole radiuses were plotted in FIG. 8 (n=22) and generated the algoritlun LPR=0.90*HR+1.71, where HR is the hole radius. The resulting fitted curve and prediction bounds shows a clear linear relationship between the diameter of the hole in each rock and the distance between the mapped lobes, indicating that the distance between the peaks x of the lobe slices 80, 84 is proportional to the hole diameter. In an application having a hole in a rock with an unknown diameter, and the average distance between the lobe centers will lead to the diameter of the hole. This experiment demonstrated that the diameter of a hole can be determined using electrolocation.

Experiment #3: Depth Measurements of a Hole or Fracture in Sandstone Formation.

Figure 9:
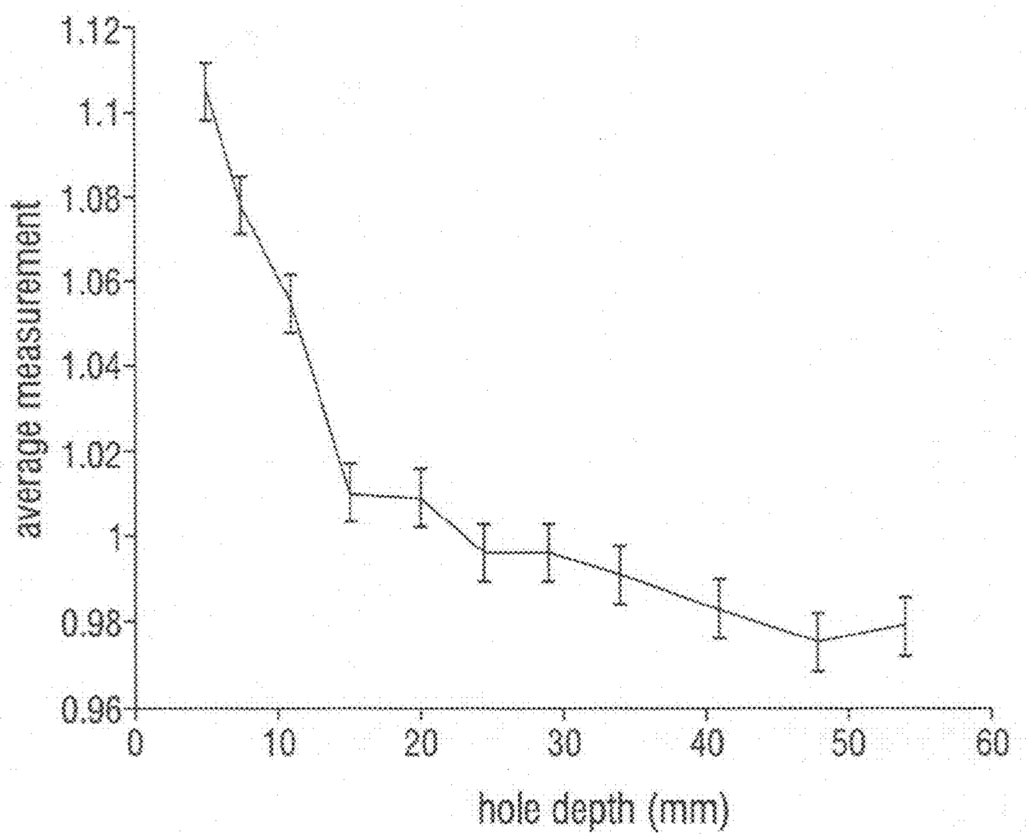
FIG. 9 is a graph of results from a third example experiment to illustrate principals applicable in accordance with an embodiment of the present disclosure.

In this experiment, two sensing electrodes and the two electric field emitter electrodes were embedded 15 mm deep into a sandstone rock placed in the tank. A 7 mm diameter hole was drilled in the center of the rock and 17 mm from each of the four electrodes. The depth of the hole was increased gradually and the electric potential was measured at each increment of hole depth. An increase in hole depth leads to a change in the conductivity between electrodes, which creates a voltage differential. A relationship between the average voltage differential between electrodes and the depth of the hole was established, as shown in FIG. 9. The value of the hole depth was accurate up to at least three times the depth of the electrodes. Such a relationship indicates that electrolocation may be useful to measure the depth of a fracture or hole in a formation rock.

In another independent aspect of the present disclosure, any of the above electrolocation apparatus and methods may be integrated or used with one or more other techniques to estimate one or more dimension or other characteristic of an underground geometric feature or area, such as to enhance or expand the results of the other. For example, one or more of the above electrolocation apparatus or methods may be integrated with a signal generating system or method as described below to together estimate the height H, width W, length L, volume, tortuosity or orientation of a fracture, or a combination thereof.

In accordance with an embodiment of the present disclosure, one or more signal generating devices are selectively provided into a well bore or subterranean formation. The signal generating devices may have any suitable form, construction, configuration and operation and may be deployed to the desired target location(s) in the well bore or subterranean formation in any suitable manner. For example, the signal generating devices may be in the form of beads, wires, pellets, spheres or other suitable items delivered in a fluid mixture or slurry with conventional fluid delivery equipment. When providing information about propped fractures and other geometric features, the signal generating devices may be used or transported in proppant, such as proppant described above, and may have one or more physical property similar to the proppant (e.g. size, shape, density, specific gravity). If desired, the signal generating devices may be clustered or agglomerated together. In preferred embodiments, it is generally desirable that the individual signal generating devices or clusters thereof are not larger than the proppant particles.

In some embodiments, the signal generating devices may themselves be the proppant ("signal generating device proppant"). When signal generating device proppant is used along with non-signal generating device proppant, it may be desirable for the signal generating device proppant to have a similar particulate size and specific gravity as the other proppant to ensure homogenous distribution. If desired, the signal generating device proppant may be coated for strength or other qualities.

In other embodiments, the signal generating devices may be included in, or provided with, other primary proppant. For example, the signal generating devices may be separate components mixed into the proppant. For another example, the signal generating devices may be bonded to or formed into the proppant particles, such as by embedding the signal generating devices within a thermoplastic proppant material or coating the signal generating devices onto the outer surface of the proppant. For cost effectiveness, it may be desirable to include a minimal effective concentration of signal generating devices.

In some embodiments, the signal generating devices include nano-devices. As used herein, the term "nano-device" includes, without limitation, one or more nano-scale sized particles, materials, devices or composites capable of being used to generate energy and/or emit a detectable signal. If desired, each nano-scale sized particle, material, device or composite may be encased or contained within another particle. The nano-scale sized particles, materials, devices or composites possess at least on feature having a nano-scale dimension, such as pore diameter, platelet length, particle mean diameter, material thickness and the like, and may be functionalized or non-functionalized. In some embodiments, the nano-scale dimension may be less than 1000 nanometers; 500 nanometers; in some embodiments, less than 200 nanometers; in some embodiments, less than 150 nanometers; in some embodiments, less than 100 nanometers; in some embodiments, less than 70 nanometers; in some embodiments, less than 50 nanometers; in some embodiments, less than 20 nanometers; in some embodiments, less than 10 nanometers; in some embodiments, less than 5 nanometers; in some embodiments, less than 1 nanometer; in some embodiments, less than 0.5 nanometers; and so on. In some embodiments, the nano-scale dimension may vary among multiple nano-devices being used.

In some instances, nano-devices may be used as the nano-components of nano-composite filled particulate proppant. In one particular embodiment, the nano-devices could be formed into deformable ULW (ultra-lightweight) proppant, such as LiteProp™ 108 offered by Baker Hughes Incorporated, the assignee of the present application. In this example, the nano-devices could either be used in place of a portion of the other nano-particles formed into the LiteProp™ 108 proppant, or added thereto.

In this embodiment, after being deployed, the signal generating devices are useful to provide one or more detectable signal that can be received and processed in any suitable manner. If desired, the signal generating devices may include power generating, transmitting or sensing capabilities, or a combination thereof. For example, each signal generating devices may be capable of generating or capturing power in-situ sufficient for the transmission of one or more detectable signal (e.g. sound waves, vibrations, radio waves of a suitable frequency). In some embodiments, the signal generating devices may generate power from or react to thermal energy or bottom hole static temperature (BHST), fluid absorption (e.g. water absorption completing circuit), particle swelling, changes in temperature, mechanical stress or pressure, or other downhole properties or conditions. In various embodiments, the signal generating devices may include one or more micro-battery for providing energy.

In some embodiments, the signal generating devices may themselves emit the signal(s). In other embodiments, the power generated by the signal generating devices may be used to actuate one or more transmitters to emit the detectable signal. When included, the transmitters may have any suitable form, configuration and operation. For example, appropriate radio wave micro-transmitters may be included in the signal generating devices, associated with or in communication with the signal generating devices or otherwise disposed sufficiently proximate to the signal generating devices to be actuated by the power provided thereby.

If desired, the signal generating devices, such as nano-devices, may include piezoelectric material(s) useful for generating power. Under the theory of direct piezoelectric effect, the piezoelectric material (e.g. certain crystals, polymers, ceramics, bone, enamel, wood, combinations thereof, etc.) is capable of generating an electric potential in response to applied mechanical stresses. If the material is not short-circuited, the applied charge induces voltage across the material. Thus, piezoelectric signal generating devices can be useful to produce electricity in response to the application of stress thereto. Accordingly, in some embodiments, piezoelectric signal generating devices may be deployed in a subterranean formation, such as in a hydraulic fracture, and activated (to generate electricity) by imposed stress on the devices caused by formation movement, such as fracture closure. The closure stress of the fracture may thus be used by the signal generating devices to create electric power.

In other embodiments, piezoelectric signal generating devices may be useful for creating motion when an electric field (such as described above with respect to the electrolocation system 5 of FIG. 1) is applied to it. Under the theory of reverse piezoelectric effect, stress or strain is produced by the piezoelectric material upon the application of an electric field. Accordingly, after these piezoelectric signal generating devices are deployed to the desired location, an electric field may be applied to the signal generating devices. The resulting motion (e.g. vibration) caused by the signal generating devices may be the detectable signal, or used to generate a detectable signal.

In some embodiments, the signal generating devices may include sound generating material. The sound generating material may, for example, be capable of emitting detectable sound waves in response to one or more downhole property or condition, such as those described above. In preferred embodiments, the sound generating material includes glass bubbles, or glass or ceramic beads, (or an agglomeration thereof), which will break when subject to one more downhole property or condition. The breaking of these materials will generate sound waves that are detectable, such as with the use of receivers (e.g. micro-seismic) as described further below. As used herein, the term "break" and variations thereof means at least one among crack, fail, fracture, collapse, expand, deform, separate, detach or shatter sufficient, depending upon the circumstances, to generate detectable sound in response to a downhole property or condition.

For example, glass or ceramic beads, as well as glass bubbles, will break under certain imposed stress caused by formation movement, such as fracture closure, sufficient to generate detectable sound emissions. In some applications, the glass or ceramic beads may sufficiently break under point-to-point stress of 7,000-9,000 psi applied thereto. For another example, glass bubbles may break, such as by expanding and shattering, due to a temperature change in the subterranean formation. In yet another example, glass bubbles may collapse due to a change in hydrostatic pressure.

The sound generating materials are not limited to the glass or ceramic beads or glass bubbles, but may be constructed of any other suitable material or combination of materials, such as certain plastics, metal alloys and other suitably brittle material, capable of sufficiently breaking and generating detectable sound in response to one or more downhole property or condition. Likewise, the sound generating materials may have any other suitable geometry and configuration, such as pellet or rods, that is capable of breaking and generating detectable sound in response to one or more downhole property or condition.

In a preferred embodiment, the sound generating materials are strong enough to avoid breaking during pumping, delivery and migration in the subterranean formation, possess particle size, particle density and transportability properties that are substantially the same as the proppant within which they are carried, and are mixed into the proppant in a sufficient volume to provide the desired sound wave transmission(s). For example, in some applications, the glass beads may be provided at 5% by weight of the proppant particles.

The signal(s) generated through use of the signal generating devices may be detectable in any suitable manner. For example, signals powered by the signal generating devices may be received by appropriate receivers disposed in the well, one or more offset wells, at the surface or other locations, or a combination thereof. If desired, receivers used in conventional micro-seismic monitoring may be used. In some embodiments, the receiver(s) may be disposed in the casing (e.g. cement, casing collar) or other component mounted in the well bore, carried on a coiled or other tubing, drill string, wireline, downhole tool or other component deployed in the well bore, or a combination thereof. In some instances, multiple receivers at different locations may be useful, such as to triangulate the source of the transmitted signals to determine location, dimensions or other variables.

If desired, systems and/or techniques of the present disclosure may be used in gathering information about variables in the well bore or subterranean formation along multiple intervals or angles in the well bore. In some applications, the same receivers may be used for receiving signals from transmitters at different locations, while in other applications, multiple sets of receivers at different locations may be warranted. For example, if the receivers are lowered into the well bore on a wireline or other carrier, the multiple sets of receivers may be disposed on the same wireline or other carrier at spaced intervals. Likewise, multiple sets of receivers may be embedded in, or connected with, the casing (not shown) or other fixture in the well bore at desired intervals to receive signals from transmitters at different target locations.

After signals are received, any methods suitable for processing them and ultimately deducing or providing the desired location, dimensions, geometry, spatial relationships or other downhole variables may be used. For example, data conversion/processing software may be used to convert transmitted radio signals into useful information. Mathematical modeling techniques, as are and become further known, may be used to formulate and apply appropriate algorithms via one or more computing device to determine the relationship between signals received and the desired variable information.

In applications where the variable includes determining one or more subterranean geometric dimension, the signals from multiple signal generating devices may be processed to determine the locations thereof. For example, the signals may be mapped in a process similar to other known micro-seismic mapping techniques. When the signal generating devices are used in proppant distributed throughout a propped fracture area, for example, such information may be used to characterize the azimuthal orientation, geometric dimensions (e.g. length, width, height, depth), underground location of all or part of the proppant pack or propped fracture area or a combination thereof. In some applications, if sufficient signal generating devices are deployed and transmissions are received, the width of the fracture may be determined. However, the present disclosure is not limited to determining the location and dimensions of hydraulic fractures. Some examples of other subterranean features that may be measured or mapped in various applications are naturally occurring fractures, wormholes or channels created by matrix stimulation and the like. If desired, other translocation technologies, such as signal reflectance and electrical resistance may be used in conjunction with apparatus, systems and/or methods of the present disclosure.

EXAMPLES

The following examples illustrate that sample sound generating material in the form of exemplary glass beads and ceramic proppant will emit detectable sound upon breakage due to the application thereto of point-to-point mechanical stress of the same general magnitude expected in certain hydraulic fracturing operations. As such, the examples illustrate the practice of one or more embodiment of the present invention. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

A modified API/ISO proppant crush test (API RP19C and ISO 13503-2) was set up to demonstrate and measure the acoustic behavior of various materials during stress application. The testing used a standard ISO crush cell having a 2" diameter piston and a MTS load frame hydraulic press (500 kpsi load capacity) with data acquisition unit. An acoustic transducer, with gel couplant applied, was mounted to the plate of the load frame and connected to an HP Universal counter and a Textronix oscilloscope. The counter was set up to monitor the total number of acoustic events (counts) and the oscilloscope displayed waveform and amplitude (loudness). A tripod-mounted digital camera was used to generate screen captures from the oscilloscope in order to document sample acoustic events.

Tests were conducted on the following materials:

1. 40 g Ottawa white sand proppant at 20/40 mesh having an average specific gravity (ASG) of 2.65
2. 40 g borosilicate glass beads at 20/40 mesh having an ASG of 2.65
3. 40 g CarboLite® (ceramic) proppant (Carb.) (sold by CARBO Ceramics, Inc.) at 20/40 mesh having an ASG 2.70
4. 40 g SinterBall Bauxite proppant (sold by Sintex Minerals & Service, Inc.) at 20/40 mesh having an ASG of 3.60
5. 53 g (95%) SinterBall Bauxite proppant and 3 g (5%) glass beads
6. 16 g LiteProp™ 108 (plastic) proppant (LP 108) at 14/40 mesh having an ASG 1.05
7. 15 g (95%) LiteProp™ 108 proppant and 1 g CarboLite® proppant Test results were obtained for (i)-(vii) above at loads applied to the piston of the filled crush cell from 100 psi-15,000 psi at a rate of 2,000 psi/minute to simulate potential subterranean fracture closing stresses. The pressure on the cell was held at 15,000 psi for 2 minutes before being unloaded to 0 psi over 2 minutes. The number of acoustic events was measured at each 1,000 psi mark and shown in Table 1. Neither the counter nor the oscilloscope were calibrated to detect specific acoustic events from specific materials, thus easily detecting all acoustic emissions in each run.

The detection levels were left the same for all tests, allowing for a direct comparison between the different materials tested.

Figure 10:
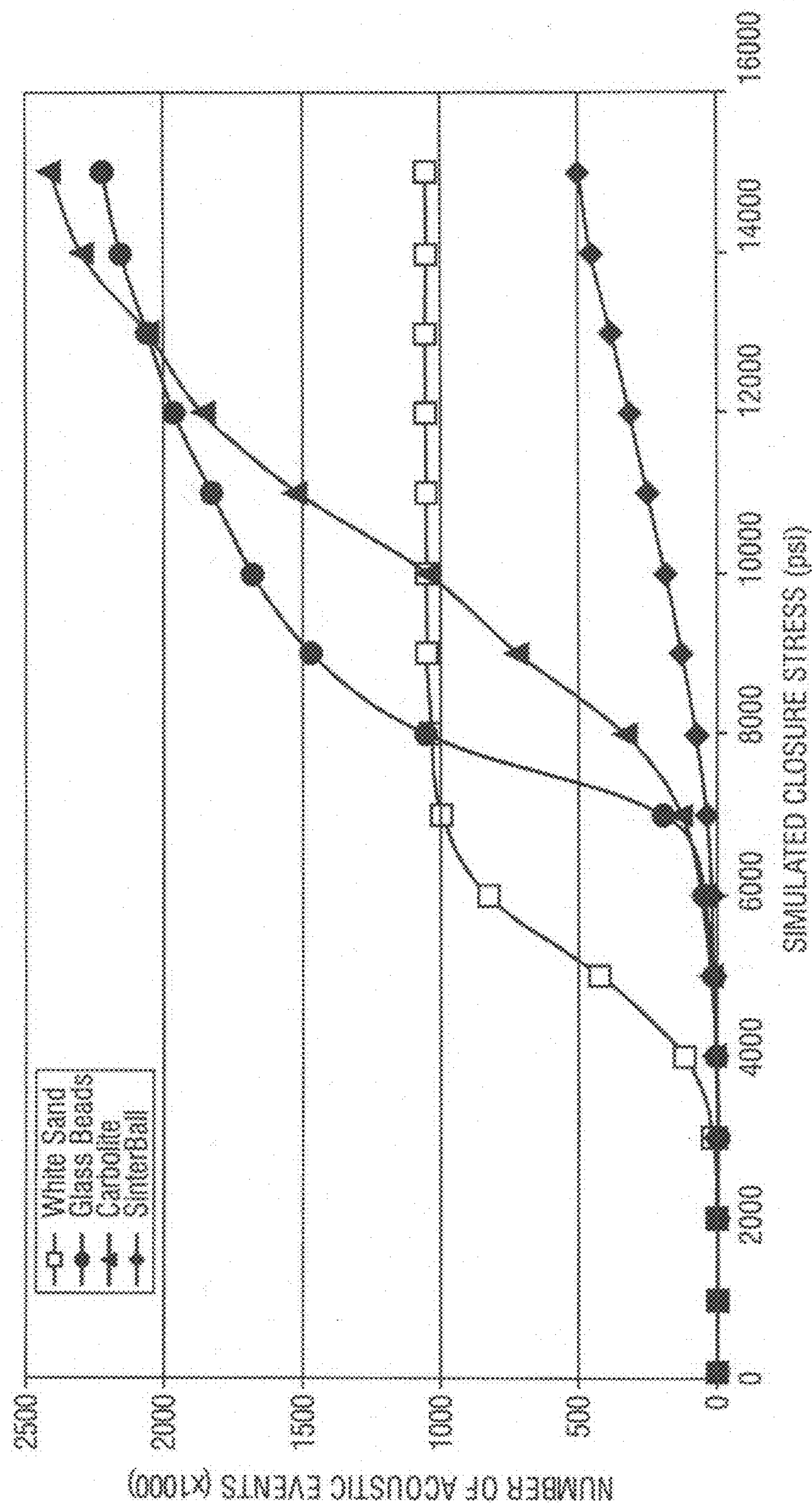
FIG. 10 is line graph illustrating acoustic emissions detected from the breaking of exemplary white sand proppant, glass beads, CarboLite® proppant and SinterBall Bauxite proppant during testing conducted to illustrate at least one embodiment of the present disclosure.
Figure 11:
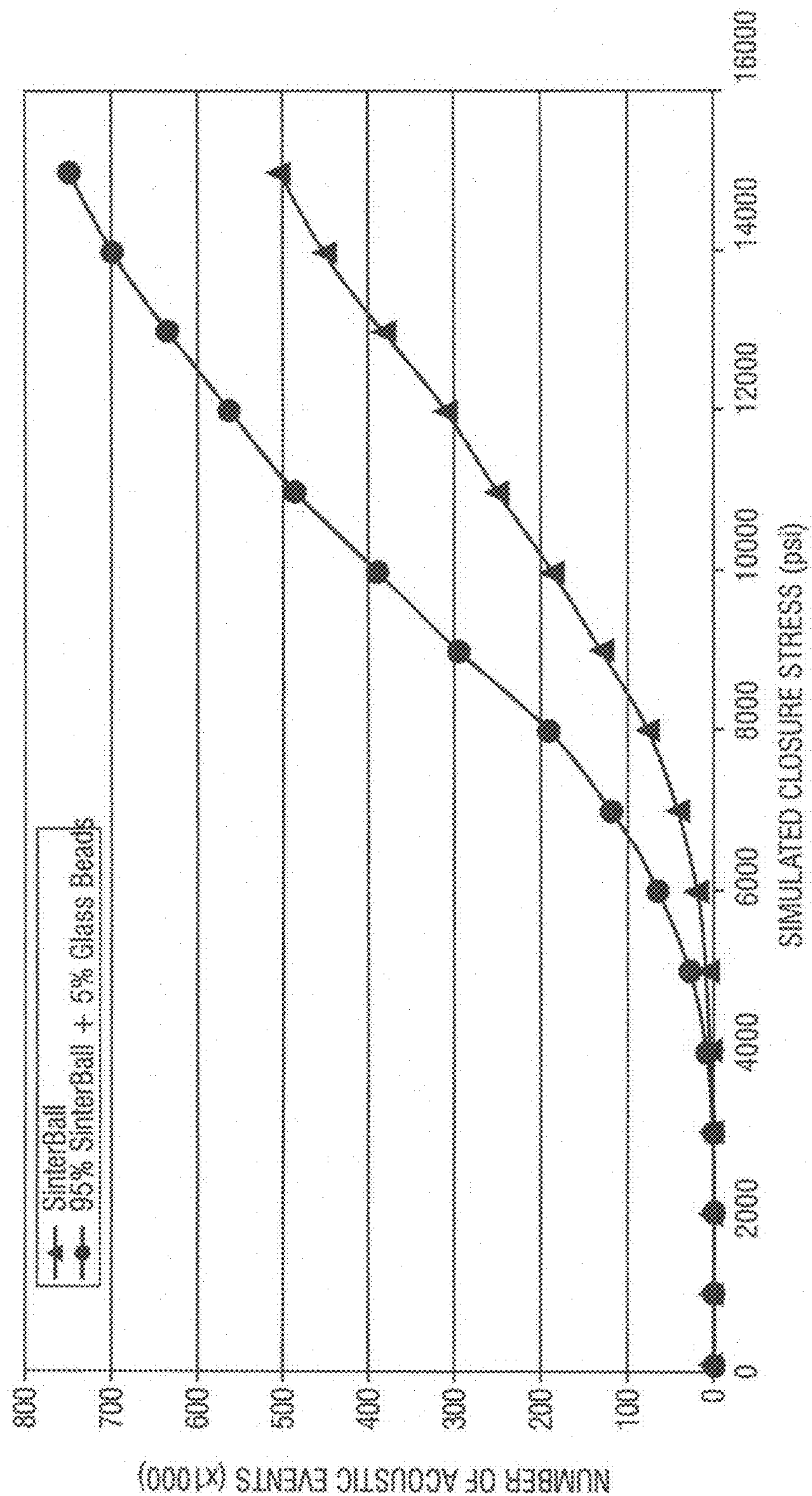
FIG. 11 is line graph comparing the acoustic emissions detected from the breaking of SinterBall Bauxite proppant and a mixture of SinterBall Bauxite proppant and glass beads during testing conducted to illustrate at least one embodiment of the present disclosure.

In FIGS. 10-13, the number of acoustic events shown for each test run in Table 1 is graphed over the duration of the tests as the applied pressure was increased. As shown in FIG. 10, the glass beads showed a most dramatic increase in counts at 7,000 psi at a magnitude of acoustic events believed to provide sufficient sound emissions to be detectable in the downhole environment. The ceramic (CarboLite®) proppant also showed a significant, though more gradual, increase around the 8,000 psi levels at count levels believed to provide detectable sound emissions. These pressures reflect typical fracture closing stresses, indicating that the glass beads and CarboLite proppant will break at the desired pressures. By comparison, the white sand and SinterBall proppants demonstrated quantities of acoustic events less likely to be detectable during typical fracture closing events.

Figure 12:
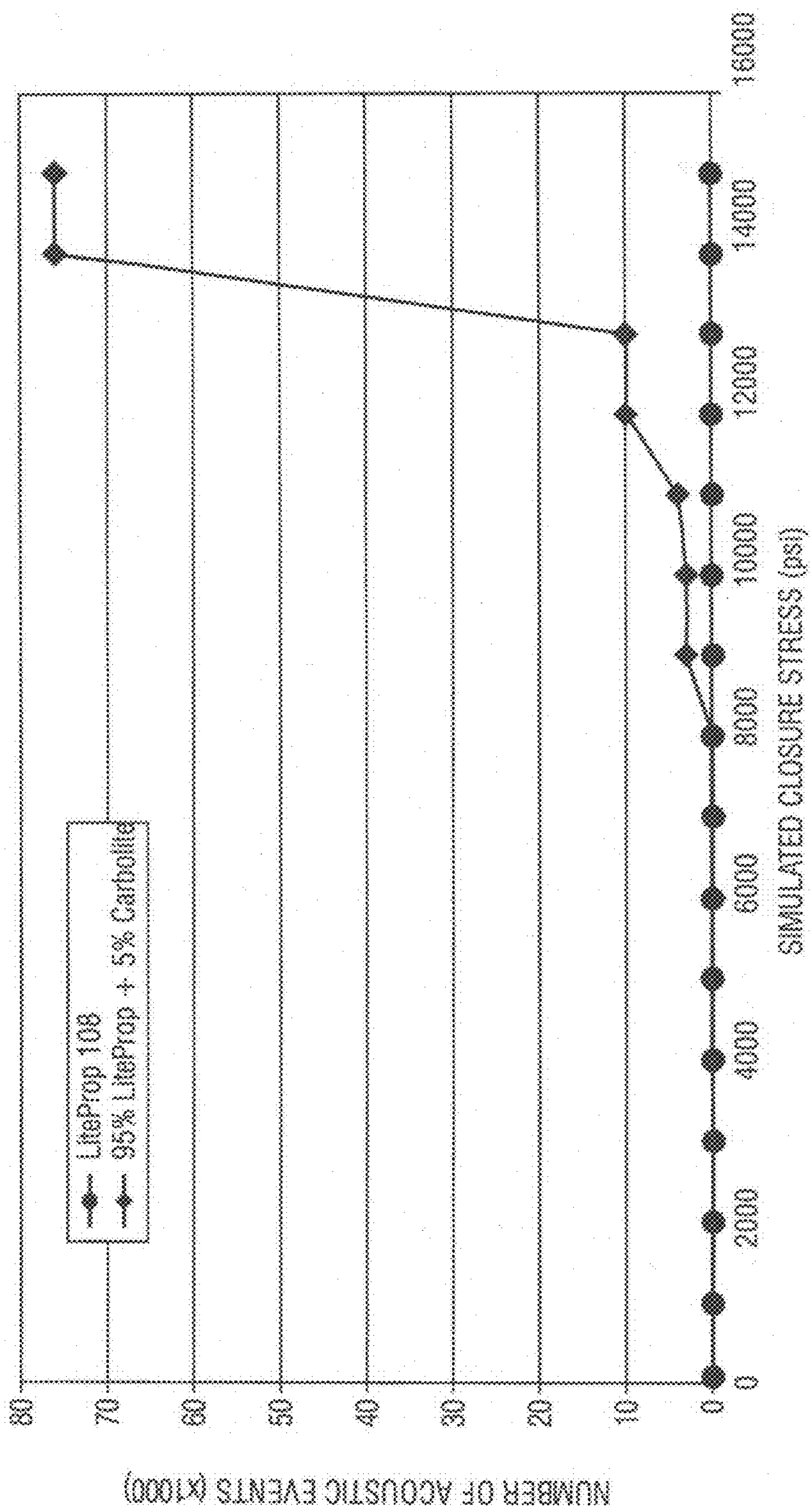
FIG. 12 is line graph comparing the acoustic emissions detected from the breaking of LiteProp™ 108 proppant and a mixture of LiteProp 108 and CarboLite proppants during testing conducted to illustrate at least one embodiment of the present disclosure.
Figure 13:
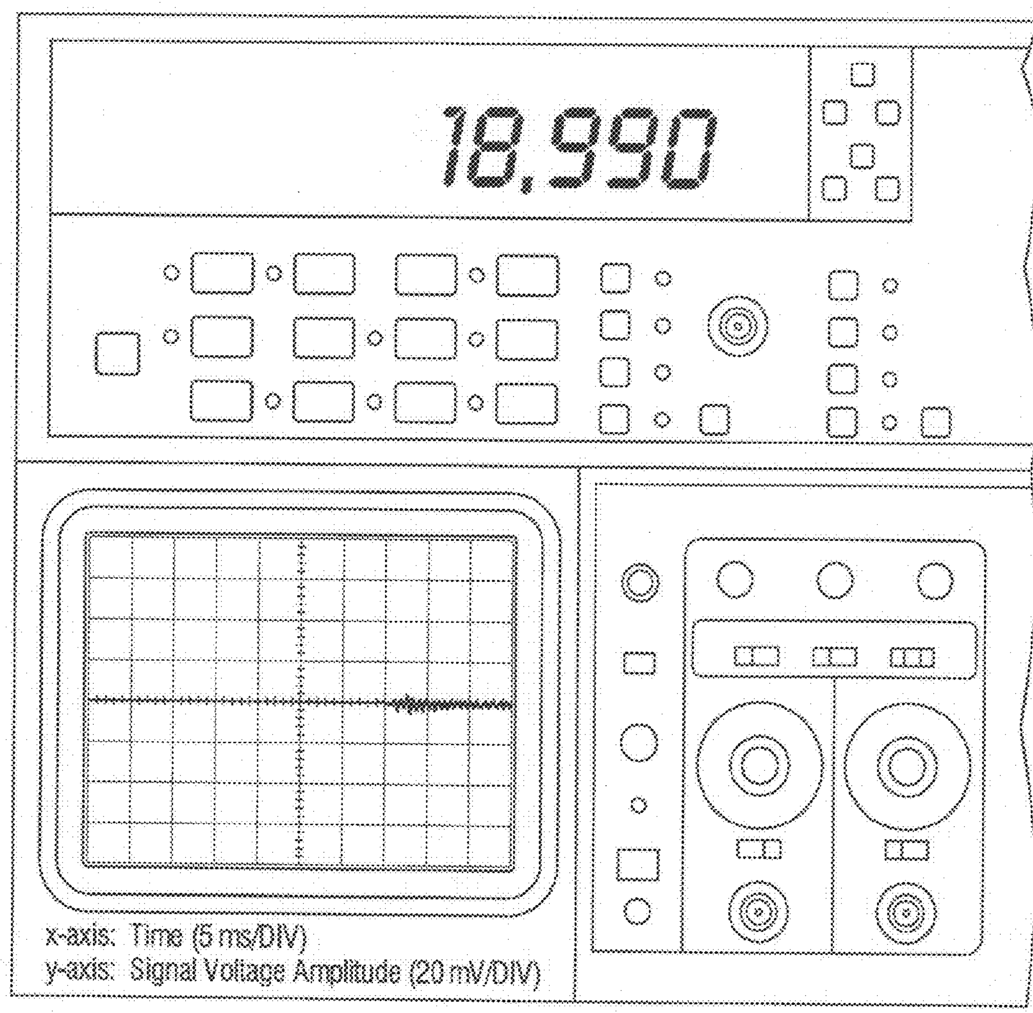
FIG. 13 is a photograph of a screen capture of an oscilloscope taken during testing of SinterBall proppant conducted to illustrate at least one embodiment of the present disclosure.

FIG. 12 illustrates that the inclusion of 5% glass beads in a SinterBall proppant mixture provided increases in acoustic events at significant multiples. Likewise, FIG. 13 shows that the inclusion of 5% CarboLite in a LiteProp 108 proppant mixture dramatically increased the number of acoustic events.

Figure 14:
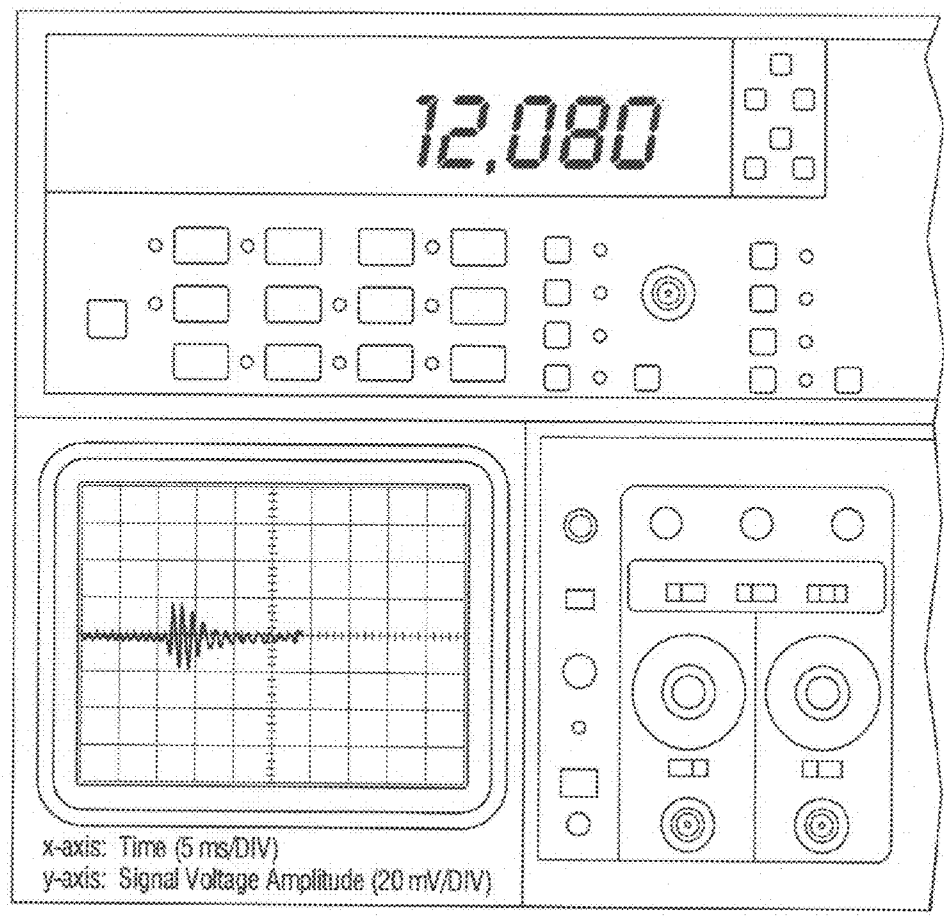
FIG. 14 is a photograph of a screen capture of an oscilloscope taken during testing of white sand proppant conducted to illustrate at least one embodiment of the present disclosure.
Figure 15:
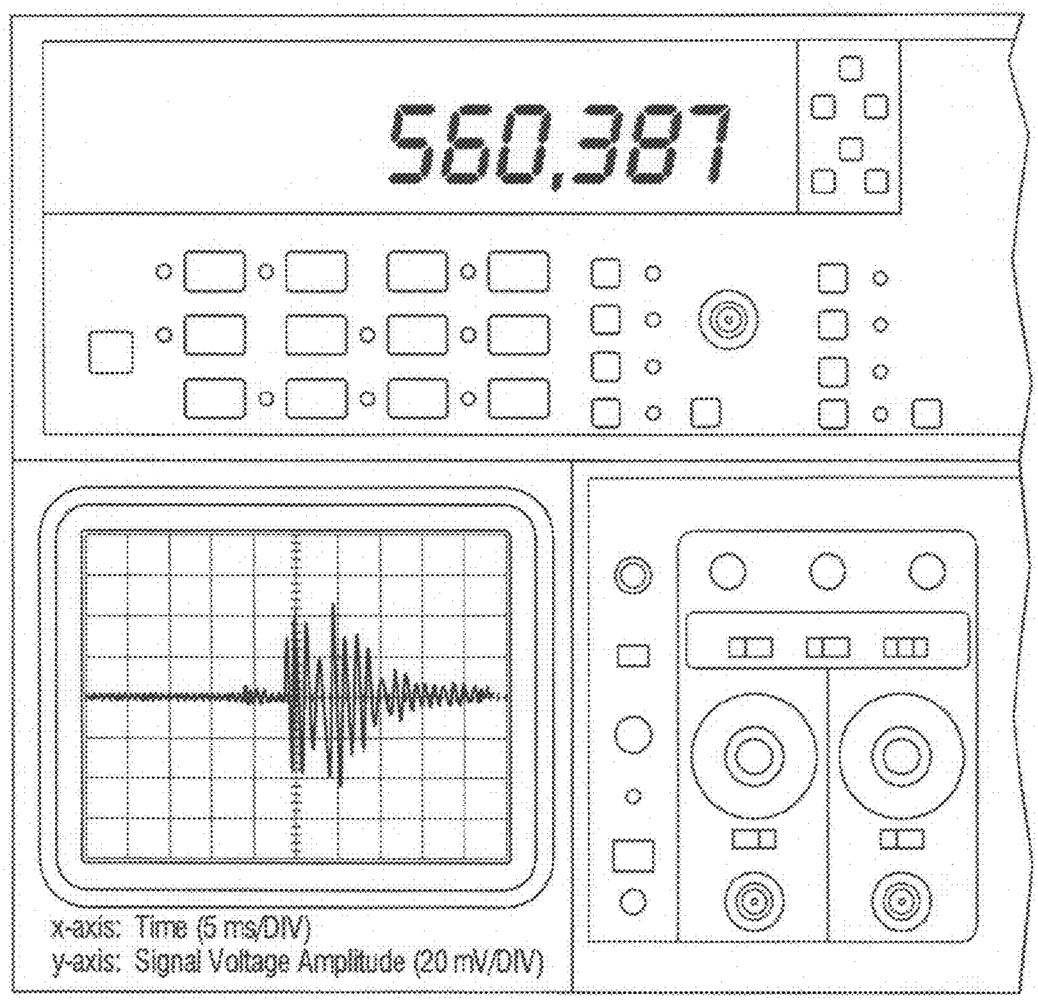
FIG. 15 is a photograph of a screen capture of an oscilloscope taken during testing of CarboLite proppant conducted to illustrate at least one embodiment of the present disclosure.

FIGS. 14-16 are sample screen captures of the oscilloscope during testing and illustrate sound waveforms (loudness) caused by breakage of the tested materials. The x axis represents testing time, while the y axis reflect amplitude of detected acoustic events. FIG. 14 is a screen shot taken during the SinterBall test run, indicating consistently quiet sound emissions and a quantity of acoustic events (breakage) believed to be insufficient to crease sufficiently detectable sound in a typical downhole environment. FIG. 15 illustrates that the breaking of the white sand proppant was substantially louder, and FIG. 16 reflects significant amplitudes of sound detected during breakage of the CarboLite. FIGS. 15 and 16 also illustrate that the amplitude of sound emissions during these test runs was greatest when the number of counts of the tested materials substantially increased, and then decreased after the number of counts reached a plateau. This data supports a finding that the CarboLite and glass beads (which showed a more dramatic increase in counts) could be ideal sound generating materials when their peak breaking pressures align with expected fracture closing stresses or other downhole events.

The percentage of crushed fines was measured through a 40 mesh screen for each run after testing. As shown in Table 1, there was significant reduction in size of the tested mass of glass beads and CarboLite proppant (as well as the white sand proppant), indicating they are susceptible to effective breakage at typical fracture closing pressures. Accordingly, the test results indicate that the certain materials, such as glass beads and ceramic proppant, will sufficiently break under applied pressures equivalent to expected subterranean fracture closing stresses and emit sound at amplitudes believed to be detectable by currently available micro-seismic receivers. Such materials may thus be effectively employed as sound generating materials in accordance with the present disclosure.

TABLE 1

| | | NUMBER OF RECORDED ACOUSTIC EVENTS/ 1000 | | | | | NUMBER OF ACOUSTIC EVENTS | |
|---|---|---|---|---|---|---|---|---|
| TIME Min. | Pressure psi | White Sand | Glass Beads | CarboLite | Sinter Ball | 95% SB + 5% Glass | LP 108 | 95% LP108 + 5% Carb. |
| 0.0 | 100 | 0.000 | 0.000 | 0.000 | 0.000 | 0.000 | 0 | 0 |
| 0.5 | 1000 | 0.010 | 0.110 | 0.000 | 0.000 | 0.000 | 0 | 0 |
| 1.0 | 2000 | 0.750 | 0.203 | 0.080 | 0.005 | 0.252 | 0 | 0 |
| 1.5 | 3000 | 17.000 | 1.222 | 0.700 | 0.141 | 1.560 | 0 | 0 |
| 2.0 | 4000 | 116.000 | 6.320 | 5.800 | 2.898 | 8.600 | 0 | 0 |
| 2.5 | 5000 | 425.000 | 17.546 | 21.900 | 8.787 | 28.200 | 0 | 0 |
| 3.0 | 6000 | 830.000 | 46.858 | 58.000 | 20.168 | 65.000 | 0 | 0 |
| 3.5 | 7000 | 1000.000 | 192.000 | 129.000 | 41.000 | 118.000 | 0 | 0 |
| 4.0 | 8000 | 1037.000 | 1060.000 | 330.000 | 77.000 | 191.000 | 0 | 0 |
| 4.5 | 9000 | 1052.000 | 1475.000 | 725.000 | 129.000 | 295.000 | 0 | 3 |
| 5.0 | 10000 | 1055.000 | 1688.000 | 1050.000 | 185.000 | 390.000 | 0 | 3 |
| 5.5 | 11000 | 1056.251 | 1832.000 | 1530.000 | 249.000 | 488.000 | 0 | 4 |
| 6.0 | 12000 | 1057.155 | 1965.000 | 1860.000 | 310.000 | 563.000 | 0 | 10 |
| 6.5 | 13000 | 1057.789 | 2060.000 | 2060.000 | 383.000 | 636.000 | 0 | 10 |
| 7.0 | 14000 | 1058.430 | 2160.000 | 2299.000 | 453.000 | 699.000 | 0 | 76 |
| 7.5 | 15000 | 1058.803 | 2223.000 | 2414.000 | 505.000 | 748.000 | 0 | 76 |
| 8.0 | 15000 | 1058.815 | 2246.000 | 2430.000 | | 766.729 | 0 | 76 |
| 8.5 | 15000 | 1058.840 | | 2443.000 | 530.000 | 772.304 | 0 | 76 |
| 9.0 | 15000 | 1058.933 | 2259.000 | 2463.000 | 534.621 | 775.756 | 0 | 76 |
| 9.5 | 15000 | 1058.933 | 2263.189 | 2469.275 | 536.829 | 777.848 | 0 | 76 |
| 11.5 | 0 | 1058.933 | 2263.754 | 2469.474 | 537.011 | 778.021 | 0 | 76 |
| Crushed Fines (%) | | 53.5 | 41.1 | 32.4 | 6.3 | 11.9 | n/a | n/a |

Preferred embodiments of the present disclosure thus offer advantages over the prior art and are well adapted to carry out one or more of the objects of this disclosure. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that are provided in or apparent from the description above or claimed herein, and any other methods which may fall within the scope of the appended claims, may be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A method of approximating or determining at least one dimension or other characteristic of at least one fracture in an earthen formation, the at least one fracture being at least partially located within a zone of interest in the earthen formation proximate to a subterranean well bore, the method comprising:

while the well bore and at least one fracture at least partially contain conductive fluid, generating an electric field in the zone of interest, at least one target object in the zone of interest having an electrical impedance that differs from the electrical impedance of the conductive fluid and creating perturbations in the electric field, providing at least two sensing electrodes in the well bore, the sensing electrodes detecting differences therebetween in electric potential caused by at least one target object and providing data relating thereto;

delivering proppant containing a plurality of signal generating devices into the at least one fracture;

at least some of the signal generating devices generating a detectable signal in response to at least one downhole condition or property;

at least one receiver receiving at least one of the detectable signals and providing data relating thereto; and approximating or determining at least one dimension or other characteristic of the at least one fracture based at least partially upon data provided by the sensing electrodes and at least one receiver.

2. The method of claim 1 further including approximating the height, width and length of the at least one fracture based at least partially upon data provided by at least one among the sensing electrodes and at least one receiver.

3. The method of claim 1 further including approximating the volume, tortuosity and orientation of the at least one fracture based at least partially upon data provided by at least one among the sensing electrodes and at least one receiver.

4. The method of claim 1 wherein the proppant is the target object.

5. The method of claim 1 wherein the wall of at least one of the fractures is the target object.

6. The method of claim 1, further including the sensing electrodes detecting differences therebetween in electric potential caused by at least one target object during first and second detection phases to provide at least first and second corresponding respective sets of data, wherein in the first detection phase, the at least one target object includes the wall of at least one of the fractures and, in the second detection phase, the at least one target object includes proppant placed into at least one of the fractures; and analyzing, processing or comparing the first and second sets of data to assist in determining at least one among dimension of at least one of the fractures.

7. The method of claim 1, further including at least some of the signal generating devices including sound generating material; and the sound generating material emitting detectable sound waves in response to at least one downhole condition or property.

8. The method of claim 7, further including providing at least one among bubbles, spheres, beads, pellets or rods constructed of at least one among glass, metal or plastic as the sound generating material.

9. The method of claim 8, further including the sound generating material breaking in response to at least one among fracture closure stress applied thereto, changes in pressure or changes in temperature to create the detectable sound waves.

10. The method of claim 9, further including triangulating detected sound waves to assist in determining at least one among at least one dimension of the at least one fracture or the location of the proppant in at least one of the fractures.

11. A method of approximating or determining at least one dimension or other characteristic of at least one underground geological feature in an earthen formation, the at least one geological feature being at least partially located within a zone of interest in the earthen formation proximate to a subterranean well bore, the method comprising:

while the well bore and at least one geological feature at least partially contain conductive fluid, generating an electric field in the zone of interest, at least one target object in the zone of interest having an electrical impedance that differs from the electrical impedance of the conductive fluid and creating perturbations in the electric field, providing at least two sensing electrodes in the well bore, the sensing electrodes detecting differences therebetween in electric potential caused by at least one target object and providing data relating thereto to at least one data processing system;

delivering proppant containing a plurality of signal generating devices into the at least one geological feature;

at least some of the signal generating devices generating a detectable signal in response to at least one downhole condition or property;

at least one receiver receiving at least one of the detectable signals and providing data relating thereto to at least one data processing system; and at least one data processing system approximating or determining at least one dimension or other characteristic of the at least one geological feature based at least partially upon data provided by the sensing electrodes and at least one receiver.

12. The method of claim 11 wherein the at least one geological feature includes at least one geological feature, further including creating the at least one geological feature by hydraulic fracturing, further wherein the height, width and length of the at least one geological feature; and the at least one data processing system approximating or determining the length, width and height of the at least one geological feature based at least partially upon data provided by the sensing electrodes and at least one receiver.

13. The method of claim 11 further including at least one among adding or altering target objects in the well bore and at least one geological feature to increase the difference in electrical impedance between the target objects and conductive fluid and improve perturbation readings by the sensing electrodes.

14. The method of claim 11 further including moving the sensing electrodes relative to the at least one target object; and the sensing electrodes detecting differences therebetween in electric potential caused by at least one target object at multiple different times and positions of the sensing electrodes relative to the at least one target object.

15. The method of claim 14 further including providing at least two spaced-apart electric field generating electrodes in the well bore, the electric field generating electrodes generating the electric field in the zone of interest; and moving the electric field generating electrodes in the well bore concurrently with moving the sensing electrodes in the well bore.

16. The method of claim 14 further including disposing the electric field generating electrodes and sensing electrodes on a common carrier that is moveable into, within and out of the well bore.

17. Apparatus for approximating or determining at least two dimensions of at least one hydraulic fracture formed in an earthen formation from a subterranean well bore, the at least one hydraulic fracture being at least partially located within a zone of interest in the earthen formation that is proximate to the well bore, the apparatus comprising:

a conductive fluid disposed at least temporarily in at least part of the well bore and at least one hydraulic fracture;

at least two spaced-apart electric field generating electrodes configured to create an electric field in the zone of interest;

at least one target object disposed within the zone of interest outside the well bore, having a different electrical impedance as compared to said conductive fluid and capable of creating perturbations in the electric field;

at least two spaced-apart sensing electrodes disposed within the well bore and configured to detect differences therebetween in electric potential measured in volts caused by said at least one target object and provide data relating thereto;

proppant containing a plurality of signal generating devices and being configured to be delivered into the at least one hydraulic fracture, at least some of said signal generating devices being configured to generate a detectable signal in response to at least one downhole condition or property;

at least one receiver configured to receive at least one of the detectable signals and providing data relating thereto; and at least one data processing system configured to approximate or determine at least two dimensions of the at least one hydraulic fracture based at least partially upon data provided by said sensing electrodes and said at least one receiver.

18. The apparatus of claim 17 wherein said at least one target object includes proppant.

19. The apparatus of claim 17 wherein said at least one target object includes the wall of at least one of the hydraulic fractures.

20. The apparatus of claim 17 wherein said signal generating devices includes at least one among bubbles, spheres, beads, pellets or rods constructed of at least one among glass, metal or plastic and configured to emit detectable sound waves, wherein said detectable signals of said signal generating devices includes said detectable sound waves emitted by said signal generating devices in response to at least one among fracture closure stress applied thereto, changes in pressure or changes in temperature.

* * * * *